(12) United States Patent (10) Patent No.: US 9,333,396 B2
Comeau et al. (45) Date of Patent: May 10, 2016

(54) COLOR GOLF BALL CONSTRUCTIONS INCORPORATING DURABLE AND LIGHT-STABLE COMPOSITIONS

(71) Applicant: Acushnet Company, Fairhaven, MA (US)

(72) Inventors: Brian Comeau, Berkley, MA (US); Matthew F. Hogge, Plymouth, MA (US); Manjari Kuntimaddi, Raynham, MA (US); Michael Michalewich, Mansfield, MA (US); Shawn Ricci, New Bedford, MA (US); Peter L. Serdahl, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 53 days.

(21) Appl. No.: 14/198,861

(22) Filed: Mar. 6, 2014

(65) Prior Publication Data

US 2015/0251059 A1    Sep. 10, 2015

(51) Int. Cl.

| | |
|---|---|
| *A63B 37/12* | (2006.01) |
| *A63B 37/00* | (2006.01) |
| *A63B 43/00* | (2006.01) |
| *A63B 45/00* | (2006.01) |
| *A63B 45/02* | (2006.01) |
| *C08G 18/48* | (2006.01) |
| *C08G 18/72* | (2006.01) |
| *C08G 18/75* | (2006.01) |
| *C08G 18/79* | (2006.01) |
| *C08G 18/10* | (2006.01) |

(52) U.S. Cl.
CPC ........... *A63B 37/0078* (2013.01); *A63B 37/008* (2013.01); *A63B 37/0022* (2013.01); *A63B 37/0023* (2013.01); *A63B 37/0024* (2013.01); *A63B 37/0031* (2013.01); *A63B 37/0033* (2013.01); *A63B 37/0039* (2013.01); *A63B 37/0041* (2013.01); *A63B 37/0043* (2013.01); *A63B 37/0045* (2013.01); *A63B 37/0046* (2013.01); *A63B 37/0061* (2013.01); *A63B 37/0062* (2013.01); *A63B 37/0063* (2013.01); *A63B 37/0064* (2013.01); *A63B 37/0065* (2013.01); *A63B 37/0075* (2013.01); *A63B 37/0087* (2013.01); *A63B 43/008* (2013.01); *A63B 45/00* (2013.01); *A63B 45/02* (2013.01); *C08G 18/10* (2013.01); *C08G 18/4854* (2013.01); *C08G 18/722* (2013.01); *C08G 18/758* (2013.01); *C08G 18/792* (2013.01)

(58) Field of Classification Search
CPC ........... A63B 37/0003; A63B 37/0022; A63B 37/0075; A63B 37/0076; A63B 37/0023; A63B 37/0038; A63B 37/0039; A63B 37/007
See application file for complete search history.

(56) References Cited

U.S. PATENT DOCUMENTS

| | | |
|---|---|---|
| 2,283,845 A | 1/1940 | Brown |
| 2,809,954 A | 10/1957 | Kazenas |
| 2,851,424 A | 9/1958 | Switzer et al. |
| 2,938,873 A | 5/1960 | Kazenas |
| 3,253,146 A | 5/1966 | de Vries |
| 3,412,036 A | 11/1968 | McIntosh |
| D228,394 S | 9/1973 | Martin et al. |
| 3,989,568 A | 11/1976 | Isaac |
| 4,123,061 A | 10/1978 | Dusbiber |
| 4,128,600 A | 12/1978 | Skinner et al. |
| 4,317,933 A | 3/1982 | Parker |
| 4,342,793 A | 8/1982 | Skinner et al. |
| 4,560,168 A | 12/1985 | Aoyama |
| 4,679,795 A | 7/1987 | Melvin et al. |
| 4,798,386 A | 1/1989 | Berard |
| 4,804,189 A | 2/1989 | Gobush |
| 4,921,759 A | 5/1990 | Orain et al. |
| 4,925,193 A | 5/1990 | Melvin |
| 4,950,696 A | 8/1990 | Palazotto et al. |
| 4,960,281 A | 10/1990 | Aoyama |
| 4,985,340 A | 1/1991 | Palazzotto et al. |
| 4,991,852 A | 2/1991 | Pattison |
| 4,998,734 A | 3/1991 | Meyer |
| 5,000,458 A | 3/1991 | Proudfit |
| 5,018,742 A | 5/1991 | Isaac et al. |
| 5,143,377 A | 9/1992 | Oka et al. |
| 5,147,900 A | 9/1992 | Palazzotto et al. |
| 5,156,405 A | 10/1992 | Kitaoh et al. |

(Continued)

FOREIGN PATENT DOCUMENTS

JP    2001-087423    4/2001

OTHER PUBLICATIONS

Mark S. Murphy; "Just Different Enough" Golf World Business; Apr. 8, 2005; p. 2.
Wilson Hope golf ball, http://www.pargolf.com/products/Wilson-Hope.htm, Jan. 27, 2005.
Color photographs of Volvik "Crystal" golf ball and packaging, 2005.
Volvik Crystal golf ball, http://www.volvik.co.kr/english/product/crystal.asp, Jan. 21, 2005.
Volvik Golf Ball Brochure, 2005, pp. 1, 16-17 and 24.
Color photographs of Volvik "Crystal" golf ball, 2004.

(Continued)

*Primary Examiner* — John E Simms, Jr.
(74) *Attorney, Agent, or Firm* — Margaret C. Barker

(57) ABSTRACT

A golf ball comprising a core, a casing layer surrounding the core, a cover layer disposed about the casing layer, and three coating layers $CL_1$, $CL_2$, and $CL_3$ disposed about the cover layer, wherein the respective compositions and color appearances of the cover, casing, $CL_1$, $CL_2$, and $CL_3$ each contribute a color appearance to an overall golf ball color appearance $CA_{OA}$ having a color stability difference $\Delta E_{cmc}$ as measured in the CIELAB color space in a QUV after 24 hrs of less than 1.5 units, or less than 1.2 units, or less than 1.15 units or up to 1.0 units.

24 Claims, No Drawings

(56) References Cited

U.S. PATENT DOCUMENTS

| | | | |
|---|---|---|---|
| 5,249,804 A | 10/1993 | Sanchez | |
| 5,256,170 A | 10/1993 | Harmer et al. | |
| 5,326,621 A | 7/1994 | Palazzotto et al. | |
| 5,334,673 A | 8/1994 | Wu | |
| 5,360,462 A | 11/1994 | Harmer et al. | |
| 5,376,428 A | 12/1994 | Palazzotto et al. | |
| 5,427,378 A | 6/1995 | Murphy | |
| 5,442,680 A | 8/1995 | Schellinger et al. | |
| 5,484,870 A | 1/1996 | Wu | |
| 5,494,291 A | 2/1996 | Kennedy | |
| 5,508,350 A | 4/1996 | Cadorniga et al. | |
| 5,562,552 A | 10/1996 | Thurman | |
| 5,575,477 A | 11/1996 | Hwang | |
| 5,605,761 A | 2/1997 | Burns et al. | |
| 5,672,643 A | 9/1997 | Burns et al. | |
| 5,674,622 A | 10/1997 | Burns et al. | |
| 5,688,191 A | 11/1997 | Cavallaro et al. | |
| 5,692,974 A | 12/1997 | Wu et al. | |
| 5,713,801 A | 2/1998 | Aoyama | |
| 5,783,293 A | 7/1998 | Lammi | |
| 5,800,286 A | 9/1998 | Kakiuchi et al. | |
| 5,803,831 A | 9/1998 | Sullivan et al. | |
| 5,820,488 A | 10/1998 | Sullivan et al. | |
| 5,823,890 A * | 10/1998 | Maruko et al. | 473/354 |
| 5,823,891 A | 10/1998 | Winskowicz | |
| 5,840,788 A * | 11/1998 | Lutz et al. | 524/95 |
| 5,885,172 A | 3/1999 | Hebert et al. | |
| 5,900,439 A | 5/1999 | Prissok et al. | |
| 5,902,191 A | 5/1999 | Masutani et al. | |
| 5,919,100 A | 7/1999 | Boehm et al. | |
| 5,929,189 A | 7/1999 | Ichikawa et al. | |
| 5,938,544 A | 8/1999 | Winskowicz | |
| 5,957,786 A | 9/1999 | Aoyama | |
| 5,957,787 A | 9/1999 | Hwang | |
| 5,965,669 A | 10/1999 | Cavallaro et al. | |
| 5,981,654 A | 11/1999 | Rajagopalan | |
| 5,981,658 A | 11/1999 | Rajagopalan | |
| 5,989,135 A | 11/1999 | Welch | |
| 5,993,968 A | 11/1999 | Umezawa et al. | |
| 6,022,279 A | 2/2000 | Yamagishi et al. | |
| 6,056,842 A | 5/2000 | Dalton et al. | |
| 6,083,119 A | 7/2000 | Sullivan et al. | |
| 6,099,415 A * | 8/2000 | Lutz | 473/357 |
| 6,120,394 A | 9/2000 | Kametani | |
| 6,149,535 A | 11/2000 | Bissonnette et al. | |
| 6,152,834 A | 11/2000 | Sullivan | |
| 6,200,232 B1 | 3/2001 | Kasashima et al. | |
| 6,207,784 B1 | 3/2001 | Rajagopalan | |
| 6,251,991 B1 | 6/2001 | Takesue et al. | |
| 6,277,037 B1 | 8/2001 | Winskowicz et al. | |
| 6,358,160 B1 | 3/2002 | Winskowicz | |
| 6,369,125 B1 | 4/2002 | Nesbitt | |
| 6,450,902 B1 | 9/2002 | Hwang | |
| 6,548,618 B2 | 4/2003 | Sullivan et al. | |
| 6,558,227 B1 | 5/2003 | Kodaira et al. | |
| 6,790,149 B2 | 9/2004 | Kennedy et al. | |
| 6,824,476 B2 | 11/2004 | Sullivan et al. | |
| 6,872,154 B2 | 3/2005 | Shannon et al. | |
| 6,949,595 B2 | 9/2005 | Morgan et al. | |
| 7,090,798 B2 | 8/2006 | Hebert et al. | |
| 7,220,192 B2 | 5/2007 | Andre et al. | |
| 7,247,697 B2 * | 7/2007 | Hogge et al. | 528/69 |
| 7,291,076 B2 | 11/2007 | Watanabe | |
| 7,722,483 B2 | 5/2010 | Morgan et al. | |
| 2002/0086743 A1 | 7/2002 | Bulpett | |
| 2004/0176184 A1 | 9/2004 | Morgan et al. | |
| 2004/0176185 A1 | 9/2004 | Morgan et al. | |
| 2004/0176188 A1 * | 9/2004 | Morgan et al. | 473/378 |
| 2005/0148409 A1 | 7/2005 | Morgan et al. | |
| 2006/0089419 A1 | 4/2006 | Hogge et al. | |
| 2007/0149323 A1 | 6/2007 | Morgan et al. | |
| 2009/0137343 A1 * | 5/2009 | Morgan et al. | 473/374 |
| 2010/0227710 A1 | 9/2010 | Morgan et al. | |
| 2010/0261550 A1 * | 10/2010 | Nagasawa et al. | 473/353 |
| 2011/0070976 A1 * | 3/2011 | Nagasawa et al. | 473/378 |
| 2011/0084422 A1 | 4/2011 | Binette et al. | |
| 2011/0086728 A1 | 4/2011 | Hogge et al. | |
| 2011/0224020 A1 | 9/2011 | Tachibana et al. | |
| 2012/0015763 A1 | 1/2012 | Isogawa et al. | |
| 2012/0021851 A1 * | 1/2012 | Hogge | 473/373 |
| 2012/0046126 A1 | 2/2012 | Chou et al. | |
| 2012/0070568 A1 | 3/2012 | Hogge | |
| 2014/0018193 A1 | 1/2014 | Morgan et al. | |

OTHER PUBLICATIONS

Color photographs of Wilson "iWound", display model only with clear cover, 2001.
"Urea", Kirk-Othmer Encyclopedia of Chemical Technology. John Wiley & Sons, Inc. copyright 1998.
Color Photographs of Wilson "Quantum" golf ball, late 1990s.
Color Photographs of Pro Keds "Crystal π" golf ball, 1980's.
Ping Two Tone Golf Balls, p. 1-5, http://www.squidoo.com/pingtwocolorgolfballs, Nov. 16, 2011.
Ebay, 2 Ping Promotional Karsten eye Golf balls both bi color, p. 1-5, http://www.ebay.com/sch/sis.html?_nkw=2+Ping+promotional+Karsten+Eye+Golf+Balls, Nov. 16, 2011.
Ebay Guides, Ping Golf Balls, Tips for Collecting Two-Colored Eyes, p. 1-3, Nov. 16, 2011.
Ebay, Ping Two Colored Golf Balls, p. 1-3, Nov. 16, 2011.
NitroGolf.com, Nitro Blaster p. 1-3, Nov. 16, 2011.
Amazon.com: Nitro Eclipse 12-Pack Golf Balls: Sports & Outdoors, p. 1-5, Nov. 16, 2011.
Nitro Eclipse Golf Balls, Crystal Golf Balls.com, p. 1-2, Nov. 16, 2011, www.crystalgolfballs.com/nitroeclipsegolfballs.aspx.
Executive Putter Pool, Sunset Golf, Inc.
HPG Hansberger Precision Golf, 1996 Game Improvement Golf Balls, Golden Girl the Ladies Choice, HPG 15 Custom Crested Golf Balls HPG 16 & HPG 17.

* cited by examiner

COLOR GOLF BALL CONSTRUCTIONS INCORPORATING DURABLE AND LIGHT-STABLE COMPOSITIONS

FIELD OF THE INVENTION

Color golf ball constructions incorporating durable and light-stable compositions in coating layers and inner layers such as covers and/or casings.

BACKGROUND OF THE INVENTION

Golfers typically settle on an ultimate golf ball of choice by visually comparing those golf balls possessing particular desired playing characteristics. In this regard, some golfers prefer colored golf balls as being aesthetically pleasing. Initially, color was incorporated in coating layers applied about a golf ball's outermost surface to add aesthetic appeal and provide overall golf ball protection. In this regard, two types of coating systems developed: colored (opaque) and clear. Opaque white coatings were first applied to golf balls since most golfers traditionally enjoyed a white colored golf ball. An outermost (clear) coating layer was also applied over surface indicia such as logos or other designs to protect these markings and the overall golf ball surface. Both types of coatings have been applied in single or multiple applications, i.e. one-coat, two-coat, etc.

In the 1980s, following introduction of ionomeric cover materials, golf ball manufacturers began to incorporate the preferred white color (as well as other colors) directly into the cover, theoretically eliminating the need for forming a white or colored coating about the cover. However, incorporating the preferred white color directly into the cover met substantial disadvantages and drawbacks. For example, some of the most preferred cover materials either did not match the ideal shade of white color or else transitioned over time from an initial desirable shade of white to a less visually appealing one—often referred to as "yellowing" (possessing poor "light stability").

Light stability relates to a material's ability to retain its original color with the passing of time. Balata and aromatic urethane compositions are two such golf ball cover materials which, due to poor light stability, have generally required an opaque coating system in order to achieve and/or maintain the preferred/optimum color shade.

And aliphatic urethane polymers, while having better light stability, tend to have reduced mechanical strength and cut/shear-resistance/durability. Thus, colored coatings remain popular with golf ball manufacturers incorporating covers formed from urethanes yet aiming to produce the most durable and aesthetically pleasing golf balls.

Thus, there remains a need for golf ball constructions wherein both colored coatings and inner layers such as covers and/or casings may retain and contribute a sustained and desirable color appearance to the golf ball's overall color appearance without sacrificing golf ball durability and playability. The current invention addresses and solves this need.

SUMMARY OF THE INVENTION

Accordingly, golf balls of the invention have an aesthetically pleasing overall golf ball color appearance that is produced by both coating layers as well as the cover layer and casing layer that have the durability of aromatic urethane compositions yet the excellent light stability/color retention provided by aliphatic urethane polymers.

In this regard, a golf ball of the invention comprises core, a casing layer surrounding the core, a cover layer disposed about the casing layer, and at least three coating layers $CL_1$, $CL_2$, and $CL_3$ disposed about the cover layer. The core is formed from a substantially homogenous formulation and comprises a geometric center and an outer surface, the outer surface having a hardness of from about 50 Shore C to about 90 Shore C, the geometric center having a hardness of from about 50 Shore C to about 90 Shore C, and the hardness of the outer surface being different than the hardness of the geometric center by up to about 7 Shore C.

The casing layer has an inner surface adjacent the outer surface and a casing layer outer surface $CL_{OS}$ surrounding the inner surface, $CL_{OS}$ having a hardness of from about 45 Shore D to about 80 Shore D. The casing layer comprises a non-fluorescent colorant composition $C_{CL}$ comprising $TiO_2$ and a blue colorant composition and having a chroma value $C^*_{CL}$ as measured in the CIELAB color space of not greater than 10. In one embodiment, the casing layer is formed from an ionomer resin or ionomeric composition such as disclosed herein below.

The cover has a cover inner surface adjacent the casing outer surface and a cover outer surface $C_{OS}$ surrounding the cover inner surface, $C_{OS}$ having a hardness of from about 65 Shore C to about 90 Shore C. The cover is formed from a thermoset polyurethane composition that is produced by a reaction of: (i) an aliphatic isocyanate composition; (ii) a polyether polyol-containing component; (iii) at least one chain-extender selected from the group consisting of amine-terminated chain-extenders, hydroxyl-terminated chain-extenders, and mixtures thereof; and (iv) a colorant composition $C_{CV}$ comprising $TiO_2$, a fluorescent colorant composition having a yellow hue as defined in the CIELAB color space, and at least one benzotriazole-based color stabilizer.

$CL_1$, $CL_2$, and $CL_3$ are different. $CL_1$ comprises an aliphatic isocyanate-based coating composition that is clear and has a color difference $\Delta E_{CMC}$ as measured in the CIELAB color space that differs from a cover $\Delta E_{CMC}$ by less than 1 unit. At least one of coating layers $CL_2$, and $CL_3$ comprise a coating composition comprising an interference and/or effects colorant composition in an amount of from 3 wt % to 30 wt % of total resin solids content of the coating composition. Each of the cover layer, $CL_1$, $CL_2$, and $CL_3$ have a b* value as measured in the CIELAB color space such that b* of the cover layer >b* of $CL_1$>b* of $CL_2$>b* of $CL_3$. The casing layer has a white opaque color appearance $CL_{CA}$ as defined in the CIELAB color space that contributes to an overall finished golf ball color appearance $CA_{OA}$. The cover has a yellow color appearance $CV_{CA}$ as defined in the CIELAB color space that contributes to $CA_{OA}$. $CL_1$ has a clear color appearance $CL_{1CA}$ as defined in the CIELAB color space. $CL_2$ has a yellow pearlescent color appearance $CL_{2CA}$ as defined in the CIELAB color space that contributes to $CA_{OA}$. $CL_3$ has an optical brightener color appearance $CL_{3CA}$ as defined in the CIELAB color space that contributes to $CA_{OA}$.

$CA_{OA}$ has a color difference $\Delta E_{CMC}$ as measured in the CIELAB color space that is less than a casing layer $\Delta E_{CMC}$ by greater than 30 units. $CA_{OA}$ has a b* value as measured in the CIELAB color space (b*$_{OA}$) that is less than b* of the cover layer by at least 10 units. $CA_{OA}$ has an a* value as measured in the CIELAB color space (a*$_{OA}$) such that $-50 \leq a^*_{OA} \leq -30$. Furthermore, $90 \leq b^*_{OA} \leq 105$. $CA_{OA}$ has a lightness value L* as measured in the CIELAB color space (L*$_{OA}$) that is greater than a lightness value of the casing layer (L*$_{cL}$) by at least 5 units. $CA_{OA}$ has a chroma value C* as measured in the CIELAB color space (C*$_{OA}$) such that C*$_{OA}$>95. And $CA_{OA}$ has a color stability difference $\Delta E_{CMC}$ as measured in the CIELAB color space in a QUV after 24 hours (hrs.) of less than 1.5 units. In another embodiment, $CA_{O4}$ has a color stability difference $\Delta E_{CMC}$ as measured in the CIELAB color space in a QUV after 24 hrs. of less than 1.2 units. In yet other embodiments, $CA_{O4}$ has a color stability difference $\Delta E_{CMC}$ as measured in the CIELAB color space in a QUV after 24 hrs. of less than 2.0 units, or less than 1.15 units, or less than 1.1 units, or less than 1.0 units or up to 1.0 units.

In one embodiment, $CL_2$ may comprise colored flakes, particulates, glitter specs, whiskers, fibers, and filaments. Additionally, lettering or other indicia may be formed upon or onto the coating layer surface.

The aliphatic isocyanate composition may comprise a blend of at least one aliphatic isocyanate and at least one cycloaliphatic isocyanate. In one embodiment, the aliphatic isocyanate comprises a hexamethylene diisocyanate-based polyisocyanate and the cycloaliphatic isocyanate comprises dicyclohexylmethane diisocyanate. For example, the aliphatic isocyanate may be based on 1,6-hexamethylene diisocyanate (HDI). Examples of cycloaliphatic diisocyanates include but are not limited to $H_{12}MDI$ (dicyclohexylmethane diisocyanate), isopropylidene-bis-4,4'-cyclohexylisocyanate, cyclohexane-1,4-diisocyanate, and IPDI (isophorone diisocyanate).

The polyether polyol-containing component may comprise polytetramethylene ether glycol (PTMEG), polyethylene propylene glycol copolymer, polyoxypropylene glycol, and mixtures thereof. The hydrocarbon chain can have saturated or unsaturated bonds and substituted or unsubstituted aromatic and cyclic groups.

In one embodiment, the cover comprises a prepolymer formed from the aliphatic isocyanate composition and a polyether polyol-containing component, which combined, is present in an amount of from about 80% to about 90% of the polyurethane cover composition. In this embodiment, the cover comprises a curative formed from the at least one aromatic amine-terminated chain-extender and colorant composition (curative), which combined, is present in a ratio of from about 10% to about 20% of the polyurethane cover composition. In another embodiment, the prepolymer is present in an amount of from about 82% to about 88% of the polyurethane cover composition, and the curative is present in a ratio of from about 12% to about 18% of the polyurethane cover composition. In yet another embodiment, the prepolymer is present in an amount of from about 84% to about 86% of the polyurethane cover composition, and the curative is present in a ratio of from about 14% to about 16% of the polyurethane cover composition.

The aliphatic isocyanate composition may comprise the aliphatic isocyanate and the cycloaliphatic isocyanate in a ratio of from about 9:1 to about 1:9. In another embodiment, the aliphatic isocyanate composition comprises the aliphatic isocyanate and the cycloaliphatic isocyanate in a ratio of from about 3:2 to about 2:3. In yet another embodiment, the aliphatic isocyanate composition comprises the aliphatic isocyanate and the cycloaliphatic isocyanate in a ratio of from about 1:2 to about 2:1. In still another embodiment, the aliphatic isocyanate composition comprises the aliphatic isocyanate and the cycloaliphatic isocyanate in a ratio of from about 2:7 to about 7:2. In an alternative embodiment, the aliphatic isocyanate composition comprises the aliphatic isocyanate and the cycloaliphatic isocyanate in a ratio of from about 3:8 to about 8:3. In a different embodiment, the aliphatic isocyanate composition comprises the aliphatic isocyanate and the cycloaliphatic isocyanate in a ratio of about 1:1.

In one embodiment, the aliphatic isocyanate and the cycloaliphatic isocyanate are present in the aliphatic isocyanate composition in a ratio of about 1:7. In another embodiment, the aliphatic isocyanate and the cycloaliphatic isocyanate are present in the aliphatic isocyanate composition in a ratio of about 2:7. In yet another embodiment, the aliphatic isocyanate and the cycloaliphatic isocyanate are present in the aliphatic isocyanate composition in a ratio of about 3.7. In still another embodiment, the aliphatic isocyanate and the cycloaliphatic isocyanate are present in the aliphatic isocyanate composition in a ratio of about 4:7. In a different embodiment, aliphatic isocyanate composition comprises the aliphatic isocyanate and the cycloaliphatic isocyanate in a ratio of about 1:1.

In one embodiment, the chain extender comprises at least one aromatic amine-terminated chain-extender.

In one embodiment, the core is formed from a polybutadiene composition and the intermediate layer is formed from an ionomeric composition, each discussed in further detail herein below. In alternative embodiments, any of the core, casing layer and cover layer may additionally comprise in part any polyurethane or polyurea composition known in the art.

In a golf ball of the invention, the core may have a diameter of from about 1.47 inches (in.) to about 1.55 in. The casing layer may have a thickness of from about 0.025 in. to about 0.057 in. The core and casing layer, combined, may have a diameter of from about 1.57 in. to about 1.65 in. The cover may have a thickness of from about 0.015 in. to about 0.055 in.

The coating layers may have a combined thickness of from about 0.1 µm to about 100 µm. In one embodiment, $CL_1$, $CL_2$ and $CL_3$, combined, have a thickness of from about 2 µm to about 50 µm. In another embodiment, $CL_1$, $CL_2$ and $CL_3$, combined, have a thickness of from about 2 µm to about 30 µm.

In one embodiment, each of coating layers $CL_1$, $CL_2$ and $CL_3$ has a thickness of from about 0.1 µm to about 50 µm. In another embodiment, each of coating layers $CL_1$, $CL_2$, and $CL_3$ has a thickness of from about 0.1 µm to about 25µ. In still another embodiment, each of coating layers $CL_1$, $CL_2$ and $CL_3$ has a thickness of from about 0.1 µm to about 14 µm. In yet another embodiment, each of coating layers $CL_1$, $CL_2$ and $CL_3$ has a thickness of from about 2 µm to about 9 µm.

The thicknesses of $CL_1$, $CL_2$ and $CL_3$ may differ by up to about 50%, or by up to 20%, or by up to about 15% or by up to about 10% or by up to about 5% or by up to about 2%. The thicknesses of $CL_1$, $CL_2$ and $CL_3$ may also differ by less than about 2%. In a different embodiment, the thicknesses of $CL_1$, $CL_2$ and $CL_3$ are substantially the same.

In one embodiment, the core is formed from a substantially homogenous formulation and comprises a geometric center and an outer surface that is adjacent the intermediate layer, wherein the outer surface has a hardness of from about 68 Shore C to about 74 Shore C. In alternative embodiments, the outer surface has a hardness of from about 68 Shore C to about 72 Shore C, or from about 68 Shore C to about 70 Shore C, or from about 70 Shore C to about 74 Shore C or from about 69 Shore C to about 71 Shore C, or from about 71 Shore C to about 73 Shore C, or from about 71 Shore C to about 74 Shore C, or from about 69 Shore C to about 74 Shore C, or from about 68 Shore C to about 73 Shore C, or from about 72 Shore C to about 74 Shore C.

Meanwhile, in one embodiment, the hardness of the outer surface may be substantially similar to a hardness of the geometric center. In yet another embodiment, the hardness of the outer surface differs from a hardness of the geometric center. In one embodiment, the hardness of the outer surface differs from a hardness of the geometric center by up to about 7 Shore C. In other embodiments, the hardness of the outer surface differs from a hardness of the geometric center by from about 1 Shore C to about 5 Shore C, or by from about 2 Shore C to about 7 Shore C, or by from about 1 Shore C to about 3 Shore C, or by from about 4 Shore C to about 7 Shore C, or by from about 2 Shore C to about 4 Shore C, or by from about 3 Shore C to about 5 Shore C, or by from about 6 Shore C to about 7 Shore C.

In other embodiments, the hardness of the outer surface differs from a hardness of the geometric center by 7 Shore C or less, or by 5 Shore C or less, or by 3 Shore C or less, or by less than about 2 Shore C.

In one embodiment, the casing layer has a surface hardness of from about 85 Shore C to about 97 Shore C. In other embodiments, the casing layer has a surface hardness of from about 85 Shore C to about 93 Shore C, or a surface hardness of from about 89 Shore C to about 97 Shore C, or a surface hardness of from about 88 Shore C to about 93 Shore C, or a surface hardness of from about 90 Shore C to about 97 Shore C, or a surface hardness of from about 86 Shore C to about 92 Shore C, or a surface hardness of from about 91 Shore C to about 95 Shore C, or a surface hardness of from about 94 Shore C to about 97 Shore C, or a surface hardness of from about 85 Shore C to about 90 Shore C.

In yet another embodiment, the casing layer has a surface hardness of from about 65 Shore D to about 75 Shore D. In other embodiments, the intermediate layer has a surface hardness of from about 68 Shore D to about 73 Shore D, or a surface hardness of from about 71 Shore D to about 74 Shore D, or a surface hardness of from about 66 Shore D to about 71 Shore D, or a surface hardness of from about 71 Shore D to about 75 Shore D, or a surface hardness of from about 67 Shore D to about 72 Shore D, or a surface hardness of from about 72 Shore D to about 75 Shore D, or a surface hardness of from about 65 Shore D to about 69 Shore D.

In one embodiment, the cover has an on the ball hardness of from about 80 Shore C to about 90 Shore C. In other embodiments, the cover has an on the ball hardness of from about 84 Shore C to about 88 Shore C, or an on the ball hardness of from about 82 Shore C to about 86 Shore C, or an on the ball hardness of from about 84 Shore C to about 89 Shore C, or an on the ball hardness of from about 85 Shore C to about 90 Shore C, or an on the ball hardness of from about 87 Shore C to about 90 Shore C, or an on the ball hardness of from about 80 Shore C to about 83 Shore C.

In yet another embodiment, the cover has an on the ball hardness of from about 55 Shore D to about 65 Shore D. In other embodiments, the cover has an on the ball hardness of from about 58 Shore D to about 63 Shore D, or an on the ball hardness of from about 60 Shore D to about 65 Shore D, or an on the ball hardness of from about 55 Shore D to about 60 Shore D, or an on the ball hardness of from about 57 Shore D to about 61 Shore D, or an on the ball hardness of from about 59 Shore D to about 64 Shore D, or an on the ball hardness of from about 56 Shore D to about 64 Shore D, or an on the ball hardness of from about 63 Shore D to about 65 Shore D, or an on the ball hardness of from about 50 Shore D to about 52 Shore D.

The USGA has established a maximum weight of 1.62 ounces (45.93 g) for golf balls. For play outside of USGA rules, the golf balls can be heavier. In one preferred embodiment, the weight of the multi-layered core is in the range of about 28 to about 38 grams. Also, golf balls made in accordance with this invention can be of any size, although the USGA requires that golf balls used in competition have a diameter of at least 1.68 inches. For play outside of United States Golf Association (USGA) rules, the golf balls can be of a smaller size. Normally, golf balls are manufactured in accordance with USGA requirements and have a diameter in the range of about 1.68 in. to about 1.80 in. However, it is envisioned that golf balls of the invention may also have a diameter of greater than 1.80 in.

In a golf ball of the invention, the cover has a thickness of 0.010 in. or greater. In one embodiment, the cover has a thickness of from about 0.020 in. to about 0.050 in. In another embodiment, the cover has a thickness of from about 0.015 in. to about 0.030 in. In yet another embodiment, the cover has a thickness of from about 0.020 in. to about 0.040 in. In still another embodiment, the cover has a thickness of from about 0.030 in. to about 0.050 in. In an alternative embodiment, the cover has a thickness of from about 0.10 in. to about 0.025 in. In a different embodiment, the cover has a thickness is greater than about 0.050 in.

In one embodiment of a golf ball of the invention, the core has a diameter of from about 1.26 in. to about 1.60 in., the cased core has a diameter of from about 1.580 in. to about 1.640 in., and the cover has a thickness of from about 0.020 in. to about 0.050 in.

In one embodiment, the core comprises a center having a diameter of from 0.100 in. to 1.100 in. and an outer core layer having a thickness of from 0.200 in. to 1.200 in. In another embodiment, the core is a single core having an outer diameter of about 1.51 in. to about 1.59 in. and having an outer surface and a geometric center.

In one embodiment, a golf ball of the invention has a coefficient of restitution (COR) of at least about 0.780. In another embodiment, a golf ball of the invention has a COR of at least about 0.790. In yet another embodiment, a golf ball of the invention has a COR of at least about 0.800. In still another embodiment, a golf ball of the invention has a COR of at least about 0.810.

A finished golf ball may have a DCM compression of from about 40 to about 120, or from about 65 to about 110, or from about 60 to about 100. In another embodiment, the core has a DCM compression of from about 47 to about 80; the intermediate layer and core, combined, have a DCM compression of from about 60 to about 95; and the golf ball has a DCM compression of from about 75 to about 100. In a different embodiment, the core has a DCM compression of from about 47 to about 55, the casing layer and core, combined, have a DCM compression of from about 56 to about 82; the core, casing layer, and cover, combined, have a DCM compression of from about 75 to about 85; and the golf ball has a DCM compression of from about 75 to about 85. In yet another embodiment, the core has a DCM compression of from about 40 to about 62; the casing layer and core, combined, have a DCM compression of from about 58 to about 92; the core, casing layer, and cover, combined, have a DCM compression of from about 58 to about 95; and the golf ball has a DCM compression of from about 58 to about 95. In still another embodiment, the core has a DCM compression of from about 20 to about 82; the casing layer and core, combined, have a DCM compression of from about 38 to about 112; the core, casing layer, and cover, combined, have a DCM compression of from about 38 to about 112; and the golf ball has a DCM compression of from about 38 to about 112. In an alternative embodiment, the core has a DCM compression of from about 38 to about 122; the casing layer and core, combined, have a DCM compression of from about 50 to about 132; the core, casing layer, and cover, combined, have a DCM compression of from about −50 to about 132; and the golf ball has a DCM compression of from about 50 to about 132.

The coefficient of restitutions (CoR) of each of the core, casing layer and core combined, cover, and the finished golf ball may be targeted and coordinated. For example, in one non-limiting embodiment, the core has a CoR of from about 0.750 to about 0.830; the casing layer and core, combined, have a CoR of from about 0.780 to about 0.850; the cover, casing layer and core, combined, have a CoR of from about 0.790 to about 0.825; and the finished golf ball has a CoR of from about 0.750 to about 0.830. Embodiments are also envisioned wherein the CoR of the finished golf ball is greater than about 0.790 or greater, or about 0.801 or greater. In another embodiment, the CoR of the casing layer and core combined is greater than the CoR of the core, and the CoR of the finished golf ball is also greater than the CoR of the core but less than the CoR of the casing layer and core combined.

In a golf ball of the invention, the resulting cover has a flexural modulus of about 10,000 psi or greater, or a flexural modulus of about 15,000 psi or greater, or a flexural modulus of about 20,000 psi or greater, as measured in accordance with ASTM method D-790. In other embodiments, the cover of a golf ball of the invention has a flexural modulus of from about 10,000 psi to about 50,000 psi, or from about 10,000 psi to about 30,000 psi, or from about 10,000 psi to about 20,000 psi.

Suitable benzotriazole UV absorbers include, but are not limited to, 2-[2-hydroxy-5-(1,1,3,3-tetramethylbutyl)phenyl]benzotriazole, TINUVIN 329; 2-(2'-hydroxy-5'-(2-hydroxyethyl))benzotriazole, NORBLOC 6000; 2-(2'-hydroxy-5'-methacryloxyethylphenyl)-2H-benzotriazole, NORBLOC 7966; 1,1,1-tris(hydroxyphenyl)ethane benzotriazole, THPE BZT; 5-t-butyl-3-(5-chloro-2H-benzotriazol-2-yl)-4-hydroxybenzenepropanoic acid octyl ester and 3-(5-chloro-2H-benzotriazol-2-yl)-5-t-butyl-4-hydroxybenzenepropanoic acid octyl ester, TINUVIN 109; a-[3-[3-(2H-benzotriazol-2-yl)-5-t-butyl-4-hydroxyphenyl]-1-oxopropyl]-w-hydroxypoly(oxy-1,2-ethanediyl) and a-[3-[3-(2H-benzotriazol-2-yl)-5-t-butyl-4-hydroxyphenyl]-1-oxopropyl]-w-[3-[3-(2H-benzotriazol-2-yl)-5-t-butyl-4-hydroxyphenyl]-1-oxopropoxy]poly(oxy-1,2-ethanediyl), TINUVIN 1130; 2-(2-Hydroxy-3,5-di-t-butylphenyl)benzotriazole, TINUVIN 320; 2-(2-hydroxy-3-t-butyl-5-methylphenyl)-5-chloro-2H-benzotriazole, TINUVIN 326; 2-(3'-5'-di-t-butyl-2'-hydroxyphenyl)-5-chlorobenzotriazole, TINUVIN 327; 2-(2-Hydroxy-3,5-di-t-amylphenyl)benzotriazole, TINUVIN 328; 3-(2H-Benzotriazol-2-yl)-5-t-butyl-4-hydroxybenzenepropanoic acid, TINUVIN 384; 2-(2H-benzotriazol-2-yl)-4-methyl-6-dodecylphenol, TINUVIN 571; 3-(2H-benzotriazol-2-yl)-5-t-butyl-4-hydroxy-1,6-hexanediyl ester of benzenepropanoic acid and 3-(2H-benzotriazol-2-yl)-5-t-butyl-4-hydroxy-methyl ester of benzenepropanoic acid, TINUVIN 840; 2-[2-hydroxy-3,5-bis-(1,1-dimethylbenzyl)phenyl]-2H-benzotriazole, TINUVIN 900; 2-(2H-benzotriazol-2-yl)-6-(1-methyl-1-phenylethyl)-4-(1,1,3,3-tetramethylbutyl)phenol, TINUVIN 928; 3-(2H-benzotriazol-2-yl)-5-t-butyl-4-hydroxybenzenepropanoic acid, C7-9 branched and linear alkyl esters, TINUVIN 99; 2-(2-hydroxy-5-methylphenyl)benzotriazole, TINUVIN P; 2-(2'-hydroxy-3'-sec-butyl-5'-t-butylphenyl)benzotriazole, TINUVIN 350; 2-(2'-hydroxy-5'-t-butylphenyl)benzotriazole, TINUVIN PS; bis[2-hydroxy-3-(2H-benzotriazol-2-yl)-5-octylphenyl]methane, TINUVIN 360; and mixtures thereof.

A golf ball of the invention retains its initial and desired overall color appearance and meanwhile displays excellent durability, as well as thermal and mechanical properties. As used herein, the term "colorant composition" refers to any medium known in the art for incorporating a colorant such as pigments, dyes, tints and/or color effects into a golf ball component.

Coating layers $CL_1$, $CL_2$, and $CL_3$ have different color appearances and different coating composition formulations at least to that extent required to create such different color appearances. Embodiments are envisioned wherein different color appearances are achieved as between $CL_1$, $CL_2$, and $CL_3$ at least in part by varying the thickness of each coating layer.

Embodiments are also envisioned wherein the golf ball comprises two coating layers selected from $CL_1$, $CL_2$, and $CL_3$. In such embodiments, all relationships defined with respect to a three coating layer golf ball of the invention apply except that the relationship $b^*CL_1 > b^*$ of $CL_2 > b^*$ of $CL_3$ would become $b^*CL_{inner} > b^*CL_{outer}$ wherein $CL_{inner}$ is the coating layer formed about the cover layer and $CL_{outer}$ is the coating layer formed about $CL_{inner}$.

Overall golf ball color appearance, as used herein, refers to the resulting overall golf ball color from the finished golf ball outer surface as either empirically evaluated or visually perceived.

The resin polymers, also called film-former or binder, binds the coating composition together and acts as the proverbial "backbone" of the coating. Solids of a coating composition is the portion of the wet coating that does not evaporate and remains after the coating has been applied to a given part. Hence, resin solids further describes the solids of the coating, separating it from any additive solids or pigment solids. Such differentiation enables comparisons to be made of other materials in a wet coating or dry film as it relates to the resin solids. Expressing the total resin solids as a 100%, you can relate pigment solids as a percentage range as compared to total resin solids. For example: a coating composition incorporating "an interference and/or effects colorant composition in an amount of 3 wt % to 30 wt % of total resin solids content of the coating composition" means that compared to the coating resin solids, the interference or effect pigments would be present at 3 wt % to 30 wt %.

Two color appearances may be compared in terms of their differences in lightness, chroma, hue, saturation, tint, shade, tone, and/or luma. In some color models, the comparison focusses solely on visually perceptable differences in lightness, chroma, hue, saturation, tint, shade, tone, and/or luma. In this regard, the two color appearances are compared with each other concerning these qualities. Thus, first and second color appearances differ where the first and second color appearances have visually perceptible differences in lightness, chroma, hue, saturation, tint, shade, tone, and/or luma.

In some color spaces, the comparison is conducted empirically by determining, for example, $\Delta E^*_{ab}$, $\Delta E^*$, $dE^*$, $dE$, or "Delta E", wherein "E" refers to "empfindung" or "sensation". Each such color space defines a unique equation for evaluating one or more of these differences. Accordingly, in one embodiment, first and second color appearances differ where they differ empirically according to an equation in any color space or color model known in the art solving, for example, for $\Delta E^*_{ab}$, $\Delta E^*$, $dE^*$, $dE$, and/or "Delta E". Hereinbelow, the light stability a golf balls of the invention GB EX. I and GB EX. II, as formulated in TABLE I, are evaluated empirically within the CIELAB Lab color space, wherein the color change or difference is denoted as $\Delta Ecmc$ as known in the art.

The CIELAB color space has three dimensions or coordinates: $L^*$, $a^*$, and $b^*$, where the $L^*$ component represents lightness, which is related to the cube root of the relative luminance of the object to the luminance of a "specified white object." The lightness value $L^*$ ranges from zero (0), which indicates black, to 100 which indicates white. The $a^*$ coordinate indicates the color's position between red/magenta and green. A negative a* value represents green and a positive a* value represents magenta. The b* coordinate indicates the position between the yellow (positive) and the blue (negative). The L* value and CIELAB ("Lab") color space is well known in the art. Herein, all CIELAB color space values such as L*, a*, be, C* and h° are measured on the ball or golf ball subassembly (e.g., on the cased core; on the covered cased core; on the painted, covered, cased core.

The human eye generally cannot perceive color changes or differences within the Lab color space of $CA_{OA}$ having a color stability difference $\Delta Ecmc < 1$. Accordingly, golf ball manufacturers desire to make golf balls having components that are formed of light-stable materials and producing a golf ball having an overall color appearance wherein $CA_{OA}$ having a color stability difference $\Delta Ecmc < 1$. As demonstrated by inventive golf ball GB EX. II (which achieves a 24 hour $CA_{OA}$ having a color stability difference $\Delta Ecmc$ of 1.19), a golf ball of the invention is desirably and synergistically closer to the $\Delta Ecmc$ target $CA_{OA}$ having a color stability difference $\Delta Ecmc < 1$ than of any of the competitive yellow golf balls evaluated herein.

In another embodiment, a method of the invention for making a golf ball of the invention comprises: providing a core; forming a casing layer about the core; forming a cover layer about the casing layer; and forming at least three coating layers $CL_1$, $CL_2$, and $CL_3$ about the cover layer; wherein the core is formed from a substantially homogenous formulation and comprises a geometric center and an outer surface, the outer surface having a hardness of from about 50 Shore C to about 90 Shore C, the geometric center having a hardness of from about 50 Shore C to about 90 Shore C, and the hardness of the outer surface being different than the hardness of the geometric center by up to about 7 Shore C; the casing layer having an inner surface adjacent the outer surface and a casing layer outer surface $CL_{OS}$ surrounding the inner surface, $CL_{OS}$ having a hardness of from about 45 Shore D to about 80 Shore D; the casing layer comprising a non-fluorescent colorant composition $C_{CL}$ comprising $TiO_2$ and a blue colorant composition and having a chroma value $C^*_{CL}$ as measured in the CIELAB color space of not greater than 10; the cover having a cover inner surface adjacent the casing outer surface and a cover outer surface $C_{OS}$ surrounding the cover inner surface, $C_{OS}$ having a hardness of from about 65 Shore C to about 90 Shore C; the cover being formed from a thermoset polyurethane composition that is produced by a reaction of: (i) an aliphatic isocyanate composition; (ii) a polyether polyol-containing component; (iii) at least one chain-extender selected from the group consisting of amine-terminated chain-extenders, hydroxyl-terminated chain-extenders, and mixtures thereof; and (iv) a colorant composition $C_{CV}$ comprising $TiO_2$, a fluorescent colorant composition having a yellow hue as defined in the CIELAB color space, and at least one benzotriazole-based color stabilizer; wherein: (i) $CL_1$; $CL_2$, and $CL_3$ are different; (ii) $CL_1$ comprises an aliphatic isocyanate-based coating composition that is clear and has a stability $\Delta E_{CMC}$ as measured in the CIELAB color space that differs from a cover $\Delta E_{CMC}$ by less than 1 unit; and (iii) at least one of coating layers $CL_2$, and $CL_3$ comprise a coating composition comprising an interference and/or effects colorant composition in an amount of from 3 wt % to 30 wt % of total resin solids; wherein each of the cover layer, $CL_1$; $CL_2$, and $CL_3$ have a b* value as measured in the CIELAB color space such that b* of the cover layer >b* of $CL_1$>b* of $CL_2$>b* of $CL_3$; and wherein: (a) the casing layer has a white opaque color appearance $CL_{CA}$ as defined in the CIELAB color space that contributes to an overall finished golf ball color appearance $CA_{OA}$; (b) the cover has a yellow color appearance $CV_{CA}$ as defined in the CIELAB color space that contributes to $CA_{OA}$; (c) $CL_1$ has a clear color appearance $CL_{1CA}$ as defined in the CIELAB color space; $CL_2$ has a yellow pearlescent color appearance $CL_{2CA}$ as defined in the CIELAB color space that contributes to $CA_{OA}$; and (d) $CL_3$ has an optical brightener color appearance $CL_{3CA}$ as defined in the CIELAB color space that contributes to $CA_{OA}$; such that: (i) $CA_{OA}$ has a color difference $\Delta E_{CMC}$ as measured in the CIELAB color space that is less than a casing layer $\Delta E_{CMC}$ by greater than 30 units; (ii) $CA_{OA}$ has a b* value as measured in the CIELAB color space ($b^*_{OA}$) that is less than b* of the cover layer by at least 10 units; (iii) $CA_{OA}$ has an a* value as measured in the CIELAB color space ($a^*_{OA}$) such that $-50 \leq a^*_{OA} \leq -30$; (iv) $90 \leq b^*_{OA} \leq 105$; (v) $CA_{DA}$ has a lightness value L* as measured in the CIELAB color space ($L^*_{OA}$) that is greater than a lightness value of the casing layer ($L^*_{CL}$) by at least 5 units; (vi) $CA_{OA}$ has a chroma value C* as measured in the CIELAB color space ($C^*_{OA}$) such that $C^*_{OA} > 95$; and wherein $CA_{OA}$ has a color stability difference $\Delta E_{CMC}$ as measured in the CIELAB color space in a QUV after 24 hrs of less than 1.5 units. In another embodiment, $CA_{OA}$ has a color stability difference $\Delta E_{CMC}$ as measured in the CIELAB color space in a QUV after 24 hrs of less than 1.2 units. In yet other embodiments, $CA_{OA}$ has a color stability difference $\Delta E_{CMC}$ as measured in the CIELAB color space in a QUV after 24 hrs of less than 2.0 units, or less than 1.1 units, or less than 1.0 units.

In a further embodiment, a golf ball of the invention comprises core, a casing layer surrounding the core, a cover layer disposed about the casing layer, and at least three coating layers $CL_1$, $CL_2$, and $CL_3$ disposed about the cover layer. The core is formed from a substantially homogenous formulation and comprises a geometric center and an outer surface, the outer surface having a hardness of from about 50 Shore C to about 90 Shore C, the geometric center having a hardness of from about 50 Shore C to about 90 Shore C, and the hardness of the outer surface being different than the hardness of the geometric center by up to about 7 Shore C.

The casing layer has an inner surface adjacent the outer surface and a casing layer outer surface $CL_{OS}$ surrounding the inner surface, $CL_{OS}$ having a hardness of from about 45 Shore D to about 80 Shore D. The casing layer has a chroma value $C^*_{CL}$ as measured in the CIELAB color space of not greater than 10.

The cover has a cover inner surface adjacent the casing outer surface and a cover outer surface $C_{OS}$ surrounding the cover inner surface, $C_{OS}$ having a hardness of from about 65 Shore C to about 90 Shore C. The cover is formed from a thermoset polyurethane composition comprising a colorant composition $C_{CV}$ having a hue defined in the CIELAB color space.

$CL_1$ comprises a coating composition having a color difference $\Delta E_{CMC}$ as measured in the CIELAB color space that differs from a cover color difference $\Delta E_{CMC}$ by less than 1 unit. Each of the cover layer, $CL_1$, $CL_2$, and $CL_3$ have a b* value as measured in the CIELAB color space such that b* of the cover layer >b* of $CL_1$>b* of $CL_2$>b* of $CL_3$.

The casing layer has a color appearance $CL_{CA}$ as defined in the CIELAB color space that contributes to an overall finished golf ball color appearance $CA_{OA}$. The cover has a color appearance $CV_{CA}$ defined in the CIELAB color space that contributes to $CA_{OA}$.

$CL_1$ has color appearance $CL_{1CA}$ defined in the CIELAB color space. $CL_2$ has a color appearance $CL_{2CA}$ defined in the CIELAB color space that contributes to $CA_{OA}$. $CL_3$ has a color appearance $CL_{3CA}$ as defined in the CIELAB color space that contributes to $CA_{OA}$.

$CA_{OA}$ has a color difference $\Delta E_{CMC}$ as measured in the CIELAB color space that is less than a casing layer color difference $\Delta E_{CMC}$ by greater than 30 units. $CA_{OA}$ has a b* value as measured in the CIELAB color space ($b^*_{OA}$) that is less than b* of the cover layer by at least 10 units. $CA_{OA}$ has an a* value as measured in the CIELAB color space ($a^*_{OA}$) such that $-50 \leq a^*_{OA} \leq -30$.

Furthermore, $90 \leq b^*_{OA} \leq 105$. $CA_{OA}$ has a lightness value L* as measured in the CIELAB color space ($L^*_{OA}$) that is greater than a lightness value of the casing layer ($L^*_{CL}$) by at least 5 units. $CA_{OA}$ has a chroma value C* as measured in the CIELAB color space ($C^*_{OA}$) such that $C^*_{OA} > 95$. And $CA_{OA}$ has a color stability difference $\Delta E_{CMC}$ as measured in the CIELAB color space in a QUV after 24 hrs. of less than 1.5 units.

In alternative embodiments, $CA_{OA}$ has a color stability difference $\Delta E_{CMC}$ as measured in the CIELAB color space in a QUV after 24 hrs of less than 2.0 units or less than 1.5 units or less than 1.2 units or less than 1.0 units.

DETAILED DESCRIPTION

The following examples demonstrate the benefits of a golf ball of the present invention. In this regard, golf ball GB Ex. I was constructed as formulated in TABLE I:

TABLE I

| Golf Ball Component | Ingredient type | Formulation | Properties |
|---|---|---|---|
| Core | BUNA ® CB 1221[1] | 85 phr | 71Shore C |
| | BUNA ® CB 23[1] | 15 phr | (Geo. |
| | TRIGONOX ™ 265[2] | 1.0 phr | Ctr. Hard.) |
| | Dymalink ™ 526[3] | 29 phr | 71Shore C |
| | POLYWATE ™ 325[4] | 20.60 phr | (Out. |
| | Zinc Oxide | 5.0 phr | Surf. Hard.) |
| | Aflux ® 16[5] | 1.0 phr | 1.51 in. |
| | Vulkanox ® BKF 75[6] | 0.56 phr | (Diameter) |
| | Rhenogran ® ZnPCTP-70[7] | 0.7 phr | |
| | Regrind | 13.7 phr | |
| | Color MB[8] | 1.31 phr | |
| Casing layer | Surlyn 7940[9] | 50% | 64Shore D |
| | Surlyn 8940[10] | 50% | (Surf. Hard.) |
| | Bright white concentrate[11] | 5% | 0.055 in. (Thickness) |
| Cover | Isocyanate(s) | 70/30 w/w Blend of Desmodur W[12] and Desmodur N-3400[13] | 84 Sh. C (Surf. Hard.) 0.030 in. (Thickness) |
| | Soft Segment | PTMEG 2000[14] | |
| | Yellow Pigmented Curative | Ethacure 100 LC[15] | |
| | Avg. NCO Functionality | 2.1 | |
| $CL_1$ | Solventborne two-component urethane primer | | 6 μm (Thickness) |

TABLE I-continued

| Golf Ball Component | Ingredient type | Formulation | Properties |
|---|---|---|---|
| $CL_2$ | Waterborne polyurethane dispersion pearlescent midcoat | | 3 μm (Thickness) |
| $CL_3$ | Solvent borne two-component urethane topcoat | | 5 μm (Thickness) |

[1]BUNA ® CB 1221 and BUNA ® CB 23 are polybutadiene rubbers available from LANXESS Corporation.
[2]TRIGONOX ™ 265 is an initiating agent available from Akzo Nobel.
[3]Dymalink ™ 526 is zinc diacrylate, available from Total
[4]POLYWATE ™ 325 is a barium sulphate, available from Cimbar Performance Minerals.
[5]Aflux ® 16 is a processing promoter available from Rhein Chemie.
[6]Vulkanox ® BKF 75 is an antioxidant available from LANXESS.
[7]Rhenogran ® ZnPCTP- 70 is available from Rhein Chemie.
[8]Color MB available from Tabor.
[9]Surlyn 7940 is medium acid, monovalent and medium flow ionomer produced by E. I. DuPont de Nemours & Company.
[10]Surlyn 8940 is medium acid, monovalent and medium flow ionomer produced by E. I. DuPont de Nemours & Company.
[11]Bright White Concentrate is available from Polymer Concentrate.
[12]Desmodur W is a cycloaliphatic diisocyanate from Bayer MaterialScience, LLC.
[13]Desmodur N-3400 is an aliphatic polyisocyanate from Bayer MaterialScience, LLC.
[14]PolyTHF 2000 is polytetramethylene ether glycol from BASF.
[15]Ethacure 100 LC is a low-color aromatic diamine curative from Albemarle.

The color of GB EX. I was evaluated. In this regard, five identical cased cores $C_{C1}$, $C_{C2}$, $C_{C3}$, $C_{C4}$, $C_{C5}$, were constructed using material from the same batch and having the formula set forth in TABLE I. A cover was formed about $C_{C2}$; a cover and coating layer $CL_1$ were formed about $C_{C3}$; a cover, a coating layer $CL_1$ and a coating layer $CL_2$ were formed about $C_{C4}$; and a cover, a coating layer $CL_1$, a coating layer $CL_2$, and a coating layer $CL_3$ were formed about $C_{C5}$. Initial L* a* b* C* and h° values were measured in the CIELAB color space for each of these constructions using a Macbeth COLOR-EYE®7000A. The results of initial measurements for $C_{C1}$, $C_{C2}$, $C_{C3}$, $C_{C4}$, $C_{C5}$ of GB EX. I are set forth in TABLE IIA below:

TABLE IIA

| | Initial | | | | |
|---|---|---|---|---|---|
| Golf ball Constr. | L* | a* | b* | C* | h° |
| Cased Core ($C_{C1}$) (appears white) | 92.04 | -1.77 | -5.49 | 5.77 | 252.14 |
| Cover ($C_{C2}$) TP Yellow Molded | 99.16 | -34.85 | 102.60 | 108.36 | 108.76 |
| $CL_1$ ($C_{C3}$) TP Clear Primed (appears yellow) | 98.94 | -35.08 | 101.99 | 107.85 | 108.98 |
| $CL_2$ ($C_{C4}$) TP Yellow Pearl Primed | 97.96 | -32.53 | 93.69 | 99.18 | 109.15 |
| $CL_3$ ($C_{C5}$) w/optical brightener (Finished Golf ball) | 98.05 | -31.95 | 90.90 | 96.35 | 109.37 |

The color difference between the color of each layer as compared with that of finished golf ball $C_{C5}$ was calculated and the results are recorded in TABLE IIB below:

TABLE IIB

| Golf ball Constr. | ΔL* | Δa* | Δb* | ΔE* | ΔL*cmc | ΔC*cmc | ΔH*cmc | ΔEcmc |
|---|---|---|---|---|---|---|---|---|
| Cased Core ($C_{C1}$) (appears white) | -6.01D | 30.18R | -96.40B | 101.19 | -2.04 | -27.00 | 19.45 | 33.33 |
| TP Yellow Molded Cover ($C_{C2}$) | 1.11D | -2.89G | 11.70Y | 12.10 | 0.38 | 3.58 | -0.47 | 3.63 |
| $CL_1$ TP Clear Primed ($C_{C3}$) (appears yellow) | 0.90L | -3.12G | 11.09Y | 11.56 | 0.30 | 3.43 | -0.30 | 3.45 |

TABLE IIB-continued

| Golf ball Constr. | ΔL* | Δa* | Δb* | ΔE* | ΔL*cmc | ΔC*cmc | ΔH*cmc | ΔEcmc |
|---|---|---|---|---|---|---|---|---|
| $CL_2$ TP Yellow Pearl Primed ($C_{C4}$) | −0.08D | −0.57G | 2.79Y | 2.85 | −0.03 | 0.84 | −0.17 | 0.86 |

Notably, the data compiled in TABLE IIA and TABLE IIB confirm at least the following relationships between layers of inventive golf ball GB EX. I:

the casing layer comprises a non-fluorescent colorant composition $C_{CL}$ comprising $TiO_2$ and a blue colorant composition and having a chroma value $C^*_{CL}$ as measured in the CIELAB color space of not greater than 10: (5.77);

$CL_1$ comprises an aliphatic isocyanate-based coating composition that is clear and has a color difference $\Delta E_{CMC}$ as measured in the CIELAB color space that differs from a cover $\Delta E_{CMC}$ by less than 1 unit: (3.63−3.45=0.18);

each of the cover layer, $CL_1$, $CL_2$, and $CL_3$ have a b* value as measured in the CIELAB color space such that b* of the cover layer >b* of $CL_1$>b* of $CL_2$>b* of $CL_3$ (102.60>101.9>93.69>90.90);

$CA_{O4}$ has a color difference $\Delta E_{CMC}$ as measured in the CIELAB color space that is less than a casing layer $\Delta E_{CMC}$ by greater than 30 units: (33.33−0.86>30);

$CA_{O4}$ has a b* value as measured in the CIELAB color space ($b^*_{O4}$) that is less than b* of the cover layer by at least 10 units: (90.90 versus 102.60);

$CA_{O4}$ has an a* value as measured in the CIELAB color space ($a^*_{O4}$) such that $-50 \leq a^*_{O4} \leq -30$: (−31.95); $90 \leq b^*_{O4} \leq 105$: (90.90);

$CA_{O4}$ has a lightness value L* as measured in the CIELAB color space ($L^*_{O4}$) that is greater than a lightness value of the casing layer ($L^*_{CL}$) by at least 5 units: (99.16−92.04=7.12); and $CA_{O4}$ has a chroma value C* as measured in the CIELAB color space ($C^*_{O4}$) such that $C^*_{O4}>95$: (96.35).

A sixth golf ball, GB EX. II, was also formed as formulated in TABLE I. GB EX. II was evaluated for color stability $\Delta E_{CMC}$ of its $CA_{O4}$ as measured in the CIELAB color space and compared with corresponding values for five competitive golf balls. The Golf balls were tested in an accelerated weathering tester (QUV) equipped with a UVA bulb. The cycle was specified at 4 hours of lamp on at 1.5 Watts/m²@50° C. followed by 4 hours off @40° C. with condensation. Subsequently, the golf balls were exposed for a 24 hour QUV cycle and then measured for color. Color values before and after QUV testing are incorporated in TABLE IIIA and TABLE IIIB. As shown in TABLE IIIB, inventive GB EX. II 24 hour ΔEcmc is 1.19-notably less than 1.2 units.

TABLE IIIA

| | Initial | | | | |
|---|---|---|---|---|---|
| Golf Ball Tested | L* | a* | b* | C* | h° |
| GB EX. II | 98.70 | −33.26 | 92.14 | 97.96 | 109.85 |
| Srixon Z Star SL Yellow | 97.88 | −40.26 | 83.11 | 92.35 | 115.85 |
| Bridgestone B330 RX Yellow | 99.03 | −24.57 | 88.45 | 91.80 | 105.53 |
| Callaway Hex Chrome Yellow | 102.40 | −31.59 | 98.80 | 103.73 | 107.73 |
| Tour Stage X01 Yellow | 88.75 | −29.38 | 69.58 | 75.51 | 112.90 |
| Titleist NXT Tour S Yellow | 103.74 | −33.16 | 98.38 | 103.82 | 108.63 |

TABLE IIIB

| | 24 Hour QUV and Δ versus Initial | | | | | | |
|---|---|---|---|---|---|---|---|
| Golf Ball Tested | L* | a* | b* | ΔL*cmc | ΔC*cmc | ΔH*cmc | ΔEcmc |
| GB EX. II | 97.34 | −30.62 | 92.03 | −0.46 | −0.29 | −1.06 | 1.19 |
| Srixon Z Star SL Yellow | 96.76 | −37.25 | 83.75 | −0.38 | −0.21 | −1.28 | 1.36 |
| Bridgestone B330 RX Yellow | 94.85 | −17.62 | 82.96 | −1.41 | −2.12 | −2.47 | 3.55 |
| Callaway Hex Chrome Yellow | 100.21 | −25.09 | 99.47 | −0.73 | −0.33 | −2.76 | 2.87 |
| Tour Stage X01 Yellow | 85.72 | −24.96 | 67.05 | −1.07 | −1.29 | −1.49 | 2.24 |
| Titleist NXT Tour S Yellow | 102.35 | −30.63 | 99.47 | −0.46 | 0.08 | −1.17 | 1.26 |

As shown in TABLE IIIB, ΔEcmc is less than 1.2 units, whereas each competitive golf ball color stability difference ΔEcmc is above 1.2 units.

Meanwhile, a golf ball of the invention is desirably durable. Inventive golf ball GB EX. II was compared with Titleist NXT Tour S Yellow (of TABLE IIIB) for durability and the results are set forth in TABLE IV below. The Titleist NXT Tour S Yellow incorporates an ionomeric cover (thermoplastic), whereas golf balls of the invention incorporate a thermoset polyurethane cover material.

Shear resistance is a golf ball's ability to withstand the shear force applied to a ball when hit with a golf club and/or iron. When the grooves on the striking surface of a golf club and/or iron impact a golf ball in a downward oblique swing causing it to slide upward across the face, and immediately forcibly propelled in an outbound trajectory from, the particular club face, the shear force applied to the golf ball cover often produces cuts or abrasion marks on the surface of the cover material of the golf ball. The durability of each golf ball may be evaluated by any procedure known in the art for evaluating durability. For example, a procedure for testing and evaluating shear resistance can include using specific golfer groups. In this case, the test golf balls are hit by a golfer or group of golfers that all used a similar make/model of club. The golfers may be a random population or from a smaller group, such as those who have a low/zero handicap, considered better playing amateurs or are considered professional. In any case, after the balls have been struck, the balls are compared to self-established "standards" and can be given a description rating (i.e. "no damage" or "paint removed, no cover damage", etc.).

TABLE IV

| GOLF BALL TESTED | DURABILITY |
| --- | --- |
| GB EX. II | Good |
| Titleist NXT Tour S Yellow | Good |

These results demonstrate that a golf ball of the invention achieves a $CA_{OA}$ having a color stability difference ΔEcmc that is closer to <1 than Titleist NXT Tour S Yellow without sacrificing durability.

Regarding general golf ball construction, cores in a golf ball of the invention may be single cores or multi-layered cores. A golf ball of the invention may also display a hardness gradient. The core hardness gradient as measured radially outward from core geometric center to outer surface may be positive, negative or zero (substantially the same hardness). Cores may have a hardness gradient defined by hardness measurements made at the center of the inner core and radially outward towards the outer surface, typically at 2-mm increments. As used herein, the terms "negative" and "positive" refer to the result of subtracting the hardness value at the innermost portion of the component being measured (e.g., the center of a solid core or an inner core in a dual core construction; the inner surface of a core layer; etc.) from the hardness value at the outer surface of the component being measured (e.g., the outer surface of a solid core; the outer surface of an inner core in a dual core; the outer surface of an outer core layer in a dual core, etc.). For example, if the outer surface of a solid core has a lower hardness value than the center (i.e., the surface is softer than the center), the hardness gradient will be deemed a "negative" gradient (a smaller number−a larger number=a negative number).

The core may be made from a composition including at least one thermoset base rubber, such as a polybutadiene rubber, cured with at least one peroxide and at least one reactive co-agent, which can be a metal salt of an unsaturated carboxylic acid, such as acrylic acid or methacrylic acid, a non-metallic coagent, or mixtures thereof. Preferably, a suitable antioxidant is included in the composition. An optional soft and fast agent (and sometimes a cis-to-trans catalyst), such as an organosulfur or metal-containing organosulfur compound, can also be included in the core formulation.

Other ingredients that are known to those skilled in the art may be used, and are understood to include, but not be limited to, density-adjusting fillers, process aides, plasticizers, blowing or foaming agents, sulfur accelerators, and/or non-peroxide radical sources.

The base thermoset rubber, which can be blended with other rubbers and polymers, typically includes a natural or synthetic rubber. A preferred base rubber is 1,4-polybutadiene having a cis structure of at least 40%, preferably greater than 80%, and more preferably greater than 90%.

Examples of desirable polybutadiene rubbers include BUNA® CB22 and BUNA® CB23, commercially available from LANXESS Corporation; UBEPOL® 360L and UBEPOL® 150L and UBEPOL-BR rubbers, commercially available from UBE Industries, Ltd. of Tokyo, Japan; BUDENE 1208, 1207, commercially available from Goodyear of Akron, Ohio; and CB BUNA® 1203G1, 1220, and 1221, commercially available from Dow Chemical Company; Europrene® NEOCIS® BR 40 and BR 60, commercially available from Polimeri Europa; and BR 01, BR 730, BR 735, BR 11, and BR 51, commercially available from Japan Synthetic Rubber Co., Ltd; and KARBOCHEM® ND40, ND45, and ND60, commercially available from Karbochem.

The base rubber may also comprise high or medium Mooney viscosity rubber, or blends thereof. A "Mooney" unit is a unit used to measure the resistance to flow of raw or unvulcanized rubber. The viscosity in a "Mooney" unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

The Mooney viscosity range is preferably greater than about 40, more preferably in the range from about 40 to about 80 and more preferably in the range from about 40 to about 60. Polybutadiene rubber with higher Mooney viscosity may also be used, so long as the viscosity of the polybutadiene does not reach a level where the high viscosity polybutadiene adversely interferes with the manufacturing machinery. It is contemplated that polybutadiene with viscosity less than 65 Mooney can be used with the present invention.

In one embodiment of the present invention, golf ball cores made with mid- to high-Mooney viscosity polybutadiene material exhibit increased resiliency (and, therefore, distance) without increasing the hardness of the ball. Such cores are soft, i.e., compression less than about 60 and more specifically in the range of about 50-55. Cores with compression in the range of from about 30 about 50 are also within the range of this preferred embodiment.

Commercial sources of suitable mid- to high-Mooney viscosity polybutadiene include LANXESS CB23 (Nd-catalyzed), which has a Mooney viscosity of around 50 and is a highly linear polybutadiene. If desired, the polybutadiene can also be mixed with other elastomers known in the art, such as other polybutadiene rubbers, natural rubber, styrene butadiene rubber, and/or isoprene rubber in order to further modify the properties of the core. When a mixture of elastomers is used, the amounts of other constituents in the core composition are typically based on 100 parts by weight of the total elastomer mixture.

In one preferred embodiment, the base rubber comprises an Nd-catalyzed polybutadiene, a rare earth-catalyzed polybutadiene rubber, or blends thereof. If desired, the polybutadiene can also be mixed with other elastomers known in the art such as natural rubber, polyisoprene rubber and/or styrene-butadiene rubber in order to modify the properties of the core. Other suitable base rubbers include thermosetting materials such as, ethylene propylene diene monomer rubber, ethylene propylene rubber, butyl rubber, halobutyl rubber, hydrogenated nitrile butadiene rubber, nitrile rubber, and silicone rubber.

Thermoplastic elastomers (TPE) may also be used to modify the properties of the core layers, or the uncured core layer stock by blending with the base thermoset rubber. These TPEs include natural or synthetic balata, or high trans-polyisoprene, high trans-polybutadiene, or any styrenic block copolymer, such as styrene ethylene butadiene styrene, styrene-isoprene-styrene, etc., a metallocene or other single-site catalyzed polyolefin such as ethylene-octene, or ethylene-butene, or thermoplastic polyurethanes (TPU), including copolymers. Other suitable TPEs for blending with the thermoset rubbers of the present invention include PEBAX®, which is believed to comprise polyether amide copolymers, HYTREL®, which is believed to comprise polyether ester copolymers, thermoplastic urethane, and KRATON®, which is believed to comprise styrenic block copolymers elastomers. Any of the TPEs or TPUs above may also contain functionality suitable for grafting, including maleic acid or maleic anhydride.

Additional polymers may also optionally be incorporated into the base rubber. Examples include, but are not limited to, thermoset elastomers such as core regrind, thermoplastic vulcanizate, copolymeric ionomer, terpolymeric ionomer, polycarbonate, polyamide, copolymeric polyamide, polyesters, polyvinyl alcohols, acrylonitrile-butadiene-styrene copolymers, polyarylate, polyacrylate, polyphenylene ether, impact-modified polyphenylene ether, high impact polystyrene, diallyl phthalate polymer, styrene-acrylonitrile polymer (SAN) (including olefin-modified SAN and acrylonitrile-styrene-acrylonitrile polymer), styrene-maleic anhydride copolymer, styrenic copolymer, functionalized styrenic copolymer, functionalized styrenic terpolymer, styrenic terpolymer, cellulose polymer, liquid crystal polymer, ethylene-vinyl acetate copolymers, polyurea, and polysiloxane or any metallocene-catalyzed polymers of these species.

Suitable polyamides for use as an additional polymeric material in compositions within the scope of the present invention also include resins obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, or decamethylenediamine, 1,4-cyclohexanediamine, or m-xylylenediamine; (2) a ring-opening polymerization of cyclic lactam, such as ε-caprolactam or Ω-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine. Specific examples of suitable polyamides include NYLON 6, NYLON 66, NYLON 610, NYLON 11, NYLON 12, copolymerized NYLON, NYLON MXD6, and NYLON 46.

Suitable peroxide initiating agents include dicumyl peroxide; 2,5-dimethyl-2,5-di(t-butylperoxy)hexane; 2,5-dimethyl-2,5-di(t-butylperoxy)hexyne; 2,5-dimethyl-2,5-di(benzoylperoxy)hexane; 2,2'-bis(t-butylperoxy)-di-isopropylbenzene; 1,1-bis(t-butylperoxy)-3,3,5-trimethyl cyclohexane; n-butyl 4,4-bis(t-butyl-peroxy)valerate; t-butyl perbenzoate; benzoyl peroxide; n-butyl 4,4'-bis(butylperoxy) valerate; di-t-butyl peroxide; or 2,5-di-(t-butylperoxy)-2,5-dimethyl hexane, lauryl peroxide, t-butyl hydroperoxide, α-α bis(t-butylperoxy) diisopropylbenzene, di(2-t-butyl-peroxyisopropyl)benzene, di-t-amyl peroxide, di-t-butyl peroxide. Preferably, the rubber composition includes from about 0.25 to about 5.0 parts by weight peroxide per 100 parts by weight rubber (phr), more preferably 0.5 phr to 3 phr, most preferably 0.5 phr to 1.5 phr. In a most preferred embodiment, the peroxide is present in an amount of about 0.8 phr. These ranges of peroxide are given assuming the peroxide is 100% active, without accounting for any carrier that might be present. Because many commercially available peroxides are sold along with a carrier compound, the actual amount of active peroxide present must be calculated. Commercially-available peroxide initiating agents include DICUP™ family of dicumyl peroxides (including DICUP™ R, DICUP™ 40C and DICUP™ 40KE) available from ARKEMA. Similar initiating agents are available from AkroChem, Lanxess, Flexsys/Harwick and R. T. Vanderbilt. Another commercially-available and preferred initiating agent is TRIGONOX™ 265-50B from Akzo Nobel, which is a mixture of 1,1-di(t-butylperoxy)-3,3,5-trimethylcyclohexane and di(2-t-butylperoxyisopropyl)benzene. TRIGONOX™ peroxides are generally sold on a carrier compound.

Suitable reactive co-agents include, but are not limited to, metal salts of diacrylates, dimethacrylates, and monomethacrylates suitable for use in this invention include those wherein the metal is zinc, magnesium, calcium, barium, tin, aluminum, lithium, sodium, potassium, iron, zirconium, and bismuth. Zinc diacrylate (ZDA) is preferred, but the present invention is not limited thereto. ZDA provides golf balls with a high initial velocity. The ZDA can be of various grades of purity. For the purposes of this invention, the lower the quantity of zinc stearate present in the ZDA the higher the ZDA purity. ZDA containing less than about 10% zinc stearate is preferable. More preferable is ZDA containing about 4-8% zinc stearate. Suitable, commercially available zinc diacrylates include those from Cray Valley. The preferred concentrations of ZDA that can be used are about 10 phr to about 40 phr, more preferably 20 phr to about 35 phr, most preferably 25 phr to about 35 phr. In a particularly preferred embodiment, the reactive co-agent is present in an amount of about 29 phr to about 31 phr.

Additional preferred co-agents that may be used alone or in combination with those mentioned above include, but are not limited to, trimethylolpropane trimethacrylate, trimethylolpropane triacrylate, and the like. It is understood by those skilled in the art, that in the case where these co-agents may be liquids at room temperature, it may be advantageous to disperse these compounds on a suitable carrier to promote ease of incorporation in the rubber mixture.

Antioxidants are compounds that inhibit or prevent the oxidative breakdown of elastomers, and/or inhibit or prevent reactions that are promoted by oxygen radicals. Some exemplary antioxidants that may be used in the present invention include, but are not limited to, quinoline type antioxidants, amine type antioxidants, and phenolic type antioxidants. A preferred antioxidant is 2,2'-methylene-bis-(4-methyl-6-t-butylphenol) available as VANOX® MBPC from R. T. Vanderbilt. Other polyphenolic antioxidants include VANOX® T, VANOX® L, VANOX® SKT, VANOX® SWP, VANOX® 13 and VANOX® 1290.

Suitable antioxidants include, but are not limited to, alkylene-bis-alkyl substituted cresols, such as 4,4'-methylene-bis (2,5-xylenol); 4,4'-ethylidene-bis-(6-ethyl-m-cresol); 4,4'-butylidene-bis-(6-t-butyl-m-cresol); 4,4'-decylidene-bis-(6-methyl-m-cresol); 4,4'-methylene-bis-(2-amyl-m-cresol); 4,4'-propylidene-bis-(5-hexyl-m-cresol); 3,3'-decylidene-bis-(5-ethyl-p-cresol); 2,2'-butylidene-bis-(3-n-hexyl-p-cresol); 4,4'-(2-butylidene)-bis-(6-t-butyl-m-cresol); 3,3'-4 (decylidene)-bis-(5-ethyl-p-cresol); (2,5-dimethyl-4-hydroxyphenyl) (2-hydroxy-3,5-dimethylphenyl) methane; (2-methyl-4-hydroxy-5-ethylphenyl) (2-ethyl-3-hydroxy-5-methylphenyl) methane; (3-methyl-5-hydroxy-6-t-butylphenyl) (2-hydroxy-4-methyl-5-decylphenyl)-n-butyl methane; (2-hydroxy-4-ethyl-5-methylphenyl) (2-decyl-3-hydroxy-4-methylphenyl)butylamylmethane; (3-ethyl-4-methyl-5-hydroxyphenyl)-(2,3-dimethyl-3-hydroxy-phenyl)nonylmethane; (3-methyl-2-hydroxy-6-ethylphenyl)-(2-isopropyl-3-hydroxy-5-methyl-phenyl)cyclohexylmethane;

(2-methyl-4-hydroxy-5-methylphenyl) (2-hydroxy-3-methyl-5-ethylphenyl)dicyclohexyl methane; and the like.

Other suitable antioxidants include, but are not limited to, substituted phenols, such as 2-tert-butyl-4-methoxyphenol; 3-tert-butyl-4-methoxyphenol; 3-tert-octyl-4-methoxyphenol; 2-methyl-4-methoxyphenol; 2-stearyl-4-n-butoxyphenol; 3-t-butyl-4-stearyloxyphenol; 3-lauryl-4-ethoxyphenol; 2,5-di-t-butyl-4-methoxyphenol; 2-methyl-4-methoxyphenol; 2-(1-methycyclohexyl)-4-methoxyphenol; 2-t-butyl-4-dodecyloxyphenol; 2-(1-methylbenzyl)-4-methoxyphenol; 2-t-octyl-4-methoxyphenol; methyl gallate; n-propyl gallate; n-butyl gallate; lauryl gallate; myristyl gallate; stearyl gallate; 2,4,5-trihydroxyacetophenone; 2,4,5-trihydroxy-n-butyrophenone; 2,4,5-trihydroxystearophenone; 2,6-ditert-butyl-4-methylphenol; 2,6-ditert-octyl-4-methylphenol; 2,6-ditert-butyl-4-stearylphenol; 2-methyl-4-methyl-6-tert-butylphenol; 2,6-distearyl-4-methylphenol; 2,6-dilauryl-4-methylphenol; 2,6-di(n-octyl)-4-methylphenol; 2,6-di(n-hexadecyl)-4-methylphenol; 2,6-di(1-methylundecyl)-4-methylphenol; 2,6-di(1-methylheptadecyl)-4-methylphenol; 2,6-di(trimethylhexyl)-4-methylphenol; 2,6-di(1,1,3,3-tetramethyloctyl)-4-methylphenol; 2-n-dodecyl-6-tert butyl-4-methylphenol; 2-n-dodecyl-6-(1-methylundecyl)-4-methylphenol; 2-n-dodecyl-6-(1,1,3,3-tetramethyloctyl)-4-methylphenol; 2-n-dodecyl-6-n-octadecyl-4-methylphenol; 2-n-dodecyl-6-n-octyl-4-methylphenol; 2-methyl-6-n-octadecyl-4-methylphenol; 2-n-dodecyl-6-(1-methylheptadecyl)-4-methylphenol; 2,6-di(1-methylbenzyl)-4-methylphenol; 2,6-di(1-methylcyclohexyl)-4-methylphenol; 2,6-(1-methylcyclohexyl)-4-methylphenol; 2-(1-methylbenzyl)-4-methylphenol; and related substituted phenols.

More suitable antioxidants include, but are not limited to, alkylene bisphenols, such as 4,4'-butylidene bis(3-methyl-6-t-butyl phenol); 2,2-butylidene bis(4,6-dimethyl phenol); 2,2'-butylidene bis(4-methyl-6-t-butyl phenol); 2,2'-butylidene bis(4-t-butyl-6-methyl phenol); 2,2'-ethylidene bis(4-methyl-6-t-butylphenol); 2,2'-methylene bis(4,6-dimethyl phenol); 2,2'-methylene bis(4-methyl-6-t-butyl phenol); 2,2'-methylene bis(4-ethyl-6-t-butyl phenol); 4,4'-methylene bis (2,6-di-t-butyl phenol); 4,4'-methylene bis(2-methyl-6-t-butyl phenol); 4,4'-methylene bis(2,6-dimethyl phenol); 2,2'-methylene bis(4-t-butyl-6-phenyl phenol); 2,2'-dihydroxy-3, 3',5,5'-tetramethylstilbene; 2,2'-isopropylidene bis(4-methyl-6-t-butyl phenol); ethylene bis(beta-naphthol); 1,5-dihydroxy naphthalene; 2,2'-ethylene bis(4-methyl-6-propyl phenol); 4,4'-methylene bis(2-propyl-6-t-butyl phenol); 4,4'-ethylene bis(2-methyl-6-propyl phenol); 2,2'-methylene bis (5-methyl-6-t-butyl phenol); and 4,4'-butylidene bis(6-butyl-3-methyl phenol);

Suitable antioxidants further include, but are not limited to, alkylene trisphenols, such as 2,6-bis(2'-hydroxy-3'-t-butyl-5'-methyl benzyl)-4-methyl phenol; 2,6-bis(2'-hydroxy-3'-t-ethyl-5'-butyl benzyl)-4-methyl phenol; and 2,6-bis(2'-hydroxy-3'-t-butyl-5'-propyl benzyl)-4-methyl phenol.

The antioxidant is typically present in an amount of about 0.1 phr to about 5 phr, preferably from about 0.1 phr to about 2 phr, more preferably about 0.1 phr to about 1 phr. In a particularly preferred embodiment, the antioxidant is present in an amount of about 0.4 phr. In an alternative embodiment, the antioxidant should be present in an amount to ensure that the hardness gradient of the inventive cores is negative. Preferably, about 0.2 phr to about 1 phr antioxidant is added to the core layer (inner core or outer core layer) formulation, more preferably, about 0.3 to about 0.8 phr, and most preferably 0.4 to about 0.7 phr. Preferably, about 0.25 phr to about 1.5 phr of peroxide as calculated at 100% active can be added to the core formulation, more preferably about 0.5 phr to about 1.2 phr, and most preferably about 0.7 phr to about 1.0 phr. The ZDA amount can be varied to suit the desired compression, spin and feel of the resulting golf ball. The cure regime can have a temperature range between from about 290° F. to about 360° F., or from about 290° F. to about 335° F., or from about 300° F. to about 325° F., or from about 330° F. to about 355° F., and the stock is held at that temperature for at least about 10 minutes to about 30 minutes.

The thermoset rubber composition in a core of the golf ball of the present invention may also include an optional soft and fast agent. As used herein, "soft and fast agent" means any compound or a blend thereof that that is capable of making a core 1) be softer (lower compression) at constant COR or 2) have a higher COR at equal compression, or any combination thereof, when compared to a core equivalently prepared without a soft and fast agent. Preferably, the composition of the present invention contains from about 0.05 phr to about 10.0 phr soft and fast agent. In one embodiment, the soft and fast agent is present in an amount of about 0.05 phr to about 3.0 phr, preferably about 0.05 phr to about 2.0 phr, more preferably about 0.05 phr to about 1.0 phr. In another embodiment, the soft and fast agent is present in an amount of about 2.0 phr to about 5.0 phr, preferably about 2.35 phr to about 4.0 phr, and more preferably about 2.35 phr to about 3.0 phr. In an alternative high concentration embodiment, the soft and fast agent is present in an amount of about 5.0 phr to about 10.0 phr, more preferably about 6.0 phr to about 9.0 phr, most preferably about 7.0 phr to about 8.0 phr. In a most preferred embodiment, the soft and fast agent is present in an amount of about 2.6 phr.

Suitable soft and fast agents include, but are not limited to, organosulfur or metal-containing organosulfur compounds, an organic sulfur compound, including mono, di, and polysulfides, a thiol, or mercapto compound, an inorganic sulfide compound, a Group VIA compound, or mixtures thereof. The soft and fast agent component may also be a blend of an organosulfur compound and an inorganic sulfide compound.

Suitable soft and fast agents of the present invention include, but are not limited to those having the following general formula:

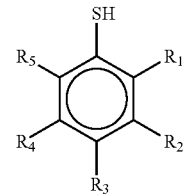

where $R_1$-$R_5$ can be $C_1$-$C_8$ alkyl groups; halogen groups; thiol groups (—SH), carboxylated groups; sulfonated groups; and hydrogen; in any order; and also pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5, 6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their zinc salts. Preferably, the halogenated thiophenol compound is pentachlorothiophenol, which is commercially available in neat form or under the tradename STRUKTOL®, a clay-based carrier containing the sulfur compound pentachlorothiophenol loaded at 45 percent (correlating to 2.4 parts PCTP). STRUKTOL® is commercially available from Struktol Company of America of Stow, Ohio. PCTP is commercially available in neat form from eChinachem of San Francisco, Calif. and in the salt form from eChinachem of San Francisco, Calif. Most preferably, the halogenated thiophenol compound is the zinc salt of pentachlorothiophenol, which is commercially available from eChinachem of San Francisco, Calif.

As used herein when referring to the invention, the term "organosulfur compound(s)" refers to any compound containing carbon, hydrogen, and sulfur, where the sulfur is directly bonded to at least 1 carbon. As used herein, the term "sulfur compound" means a compound that is elemental sulfur, polymeric sulfur, or a combination thereof. It should be further understood that the term "elemental sulfur" refers to the ring structure of $S_8$ and that "polymeric sulfur" is a structure including at least one additional sulfur relative to elemental sulfur.

Additional suitable examples of soft and fast agents (that are also believed to be cis-to-trans catalysts) include, but are not limited to, 4,4'-diphenyl disulfide; 4,4'-ditolyl disulfide; 2,2'-benzamido diphenyl disulfide; bis(2-aminophenyl)disulfide; bis(4-aminophenyl)disulfide; bis(3-aminophenyl)disulfide; 2,2'-bis(4-aminonaphthyl)disulfide; 2,2'-bis(3-aminonaphthyl)disulfide; 2,2'-bis(4-aminonaphthyl)disulfide; 2,2'-bis(5-aminonaphthyl)disulfide; 2,2'-bis(6-aminonaphthyl)disulfide; 2,2'-bis(7-aminonaphthyl)disulfide; 2,2'-bis(8-aminonaphthyl)disulfide; 1,1'-bis(2-aminonaphthyl)disulfide; 1,1'-bis(3-aminonaphthyl)disulfide; 1,1'-bis(3-aminonaphthyl)disulfide; 1,1'-bis(4-aminonaphthyl)disulfide; 1,1'-bis(5-aminonaphthyl)disulfide; 1,1'-bis(6-aminonaphthyl)disulfide; 1,1'-bis(7-aminonaphthyl)disulfide; 1,1'-bis(8-aminonaphthyl)disulfide; 1,2'-diamino-1,2'-dithiodinaphthalene; 2,3'-diamino-1,2'-dithiodinaphthalene; bis(4-chlorophenyl)disulfide; bis(2-chlorophenyl)disulfide; bis(3-chlorophenyl)disulfide; bis(4-bromophenyl)disulfide; bis(2-bromophenyl)disulfide; bis(3-bromophenyl)disulfide; bis(4-fluorophenyl)disulfide; bis(4-iodophenyl)disulfide; bis(2,5-dichlorophenyl)disulfide; bis(3,5-dichlorophenyl)disulfide; bis(2,4-dichlorophenyl)disulfide; bis(2,6-dichlorophenyl)disulfide; bis(2,5-dibromophenyl)disulfide; bis(3,5-dibromophenyl)disulfide; bis(2-chloro-5-bromophenyl)disulfide; bis(2,4,6-trichlorophenyl)disulfide; bis(2,3,4,5,6-pentachlorophenyl)disulfide; bis(4-cyanophenyl)disulfide; bis(2-cyanophenyl)disulfide; bis(4-nitrophenyl)disulfide; bis(2-nitrophenyl)disulfide; 2,2'-dithiobenzoic acid ethylester; 2,2'-dithiobenzoic acid methylester; 2,2'-dithiobenzoic acid; 4,4'-dithiobenzoic acid ethylester; bis(4-acetylphenyl)disulfide; bis(2-acetylphenyl)disulfide; bis(4-formylphenyl)disulfide; bis(4-carbamoylphenyl)disulfide; 1,1'-dinaphthyl disulfide; 2,2'-dinaphthyl disulfide; 1,2'-dinaphthyl disulfide; 2,2'-bis(1-chlorodinaphthyl)disulfide; 2,2'-bis(1-bromonaphthyl) disulfide; 1,1'-bis(2-chloronaphthyl)disulfide; 2,2'-bis(1-cyanonaphthyl)disulfide; 2,2'-bis(1-acetylnaphthyl)disulfide; and the like; or a mixture thereof. Preferred organosulfur components include 4,4'-diphenyl disulfide, 4,4'-ditolyl disulfide, or 2,2'-benzamido diphenyl disulfide, or a mixture thereof. A more preferred organosulfur component includes 4,4'-ditolyl disulfide. In another embodiment, metal-containing organosulfur components can be used according to the invention. Suitable metal-containing organosulfur components include, but are not limited to, cadmium, copper, lead, and tellurium analogs of diethyldithiocarbamate, diamyldithiocarbamate, and dimethyldithiocarbamate, or mixtures thereof.

Suitable substituted or unsubstituted aromatic organic components that do not include sulfur or a metal include, but are not limited to, 4,4'-diphenyl acetylene, azobenzene, or a mixture thereof. The aromatic organic group preferably ranges in size from $C_6$ to $C_{20}$, and more preferably from $C_6$ to $C_{10}$. Suitable inorganic sulfide components include, but are not limited to titanium sulfide, manganese sulfide, and sulfide analogs of iron, calcium, cobalt, molybdenum, tungsten, copper, selenium, yttrium, zinc, tin, and bismuth.

A substituted or unsubstituted aromatic organic compound is also suitable as a soft and fast agent. Suitable substituted or unsubstituted aromatic organic components include, but are not limited to, components having the formula $(R_1)_x$—$R_3$-M-$R_4$—$(R_2)_y$, wherein $R_1$ and $R_2$ are each hydrogen or a substituted or unsubstituted $C_{1-20}$ linear, branched, or cyclic alkyl, alkoxy, or alkylthio group, or a single, multiple, or fused ring $C_6$ to $C_{24}$ aromatic group; x and y are each an integer from 0 to 5; $R_3$ and $R_4$ are each selected from a single, multiple, or fused ring $C_6$ to $C_{24}$ aromatic group; and M includes an azo group or a metal component. $R_3$ and $R_4$ are each preferably selected from a $C_6$ to $C_{10}$ aromatic group, more preferably selected from phenyl, benzyl, naphthyl, benzamido, and benzothiazyl. $R_1$ and $R_2$ are each preferably selected from a substituted or unsubstituted $C_{1-10}$ linear, branched, or cyclic alkyl, alkoxy, or alkylthio group or a $C_6$ to $C_{10}$ aromatic group. When $R_1$, $R_2$, $R_3$, or $R_4$, are substituted, the substitution may include one or more of the following substituent groups: hydroxy and metal salts thereof; mercapto and metal salts thereof; halogen; amino, nitro, cyano, and amido; carboxyl including esters, acids, and metal salts thereof; silyl; acrylates and metal salts thereof; sulfonyl or sulfonamide; and phosphates and phosphites. When M is a metal component, it may be any suitable elemental metal available to those of ordinary skill in the art. Typically, the metal will be a transition metal, although preferably it is tellurium or selenium. In one embodiment, the aromatic organic compound is substantially free of metal, while in another embodiment the aromatic organic compound is completely free of metal.

The soft and fast agent can also include a Group VIA component. Elemental sulfur and polymeric sulfur are commercially available from Elastochem, Inc. of Chardon, Ohio Exemplary sulfur catalyst compounds include PB(RM-S)-80 elemental sulfur and PB(CRST)-65 polymeric sulfur, each of which is available from Elastochem, Inc. An exemplary tellurium catalyst under the tradename TELLOY® and an exemplary selenium catalyst under the tradename VANDEX® are each commercially available from RT Vanderbilt.

Fillers may also be added to the thermoset rubber composition of the core to adjust the density of the composition, up or down. Typically, fillers include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, trans-regrind core material (recycled core material containing high trans-isomer of polybutadiene), and the like. When trans-regrind is present, the amount of trans-isomer is preferably between about 10% and about 60%. In a preferred embodiment of the invention, the core comprises polybutadiene having a cis-isomer content of greater than about 95% and trans-regrind core material (already vulcanized) as a filler. Any particle size trans-regrind core material is sufficient, but is preferably less than about 125 μm.

Fillers added to one or more portions of the golf ball typically include processing aids or compounds to affect rheological and mixing properties, density-modifying fillers, tear strength, or reinforcement fillers, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Fillers may include polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

Materials such as tungsten, zinc oxide, barium sulfate, silica, calcium carbonate, zinc carbonate, metals, metal oxides and salts, and regrind (recycled core material typically ground to about 30 mesh particle) are also suitable fillers.

The polybutadiene and/or any other base rubber or elastomer system may also be foamed, or filled with hollow microspheres or with expandable microspheres which expand at a set temperature during the curing process to any low specific gravity level. Other ingredients such as sulfur accelerators, e.g., tetramethylthiuram di, tri, or tetrasulfide, and/or metal-containing organosulfur components may also be used according to the invention. Suitable metal-containing organosulfur accelerators include, but are not limited to, cadmium, copper, lead, and tellurium analogs of diethyldithiocarbamate, diamyldithiocarbamate, and dimethyldithiocarbamate, or mixtures thereof. Other ingredients such as processing aids e.g., fatty acids and/or their metal salts, processing oils, dyes and pigments, as well as other additives known to one skilled in the art may also be used in the present invention in amounts sufficient to achieve the purpose for which they are typically used.

Without being bound by theory, it is believed that the percentage of double bonds in the trans configuration may be manipulated throughout a core containing at least one main-chain unsaturated rubber (i.e., polybutadiene), plastic, or elastomer resulting in a trans gradient. The trans gradient may be influenced (up or down) by changing the type and amount of cis-to-trans catalyst (or soft-and-fast agent), the type and amount of peroxide, and the type and amount of coagent in the formulation. For example, a formulation containing about 0.25 phr ZnPCTP may have a trans gradient of about 5% across the core whereas a formulation containing about 2 phr ZnPCTP may have a trans gradient of about 10%, or higher. The trans gradient may also be manipulated through the cure times and temperatures. It is believed that lower temperatures and shorter cure times yield lower trans gradients, although a combination of many of these factors may yield gradients of differing and/or opposite directions from that resulting from use of a single factor.

In general, higher and/or faster cure rates tend to yield higher levels of trans content, as do higher concentrations of peroxides, soft-and-fast agents, and, to some extent, ZDA concentration. Even the type of rubber may have an effect on trans levels, with those catalyzed by rare-earth metals, such as Nd, being able to form higher levels of trans polybutadiene compared to those rubbers formed from Group VIII metals, such as Co, Ni, and Li.

Cores may have an outer surface and a center and be formed from a substantially homogenous rubber composition. An intermediate layer, such as a casing layer (inner cover), is disposed about the core, and a cover layer is formed around the intermediate layer, the cover being formed from the materials detailed herein. In some embodiments, a hardness of the outer surface of the core differs from a hardness of the geometric center as defined herein. In other embodiments, the hardness of the outer surface and hardness of the geometric center do not differ.

Additionally, a core may have a 'dual core' arrangement, including a center and at least one outer core layer.

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within ±0.004 in. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The hardness of a core may be measured by taking measurements at the center of the core and radially outward toward the surface of the core, typically at 2-mm increments. As used herein, the terms "negative" and "positive" refer to the result of subtracting the hardness value at the innermost portion of the component being measured (e.g., the center of a core) from the hardness value at the outer surface of the component being measured (e.g., the outer surface of the single core or the outer surface of an outer core layer in a dual core arrangement, etc.).

The center hardness of a core and the outer surfaces of a single core or outer core layer in a multi-layer core arrangement are readily determined according to the procedures given herein if the measurement is made prior to surrounding the layer with an additional core layer.

Once an additional core layer surrounds a layer of interest, the hardness of the inner and outer surfaces of any inner or intermediate layers can be difficult to determine so that a different procedure detailed below may be used for measuring a point located 1 mm from an interface is used. The hardness of a golf ball layer at a point located 1 mm from an interface is obtained according to the following procedure. First, an axis defining the geometric center of the core is revealed by preparing the core according to the above procedure for measuring the center hardness of a core. Leaving the core in the holder, a point located 1 mm radially inward or outward from the interface of two layers is determined and marked, and the hardness thereof is measured according to ASTM D-2240.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to insure that the golf ball or golf ball subassembly is centered under the durometer indentor before a surface hardness reading is obtained. A calibrated, digital durometer, capable of reading to 0.1 hardness units is used for all hardness measurements and the maximum reading is obtained. The digital durometer must be attached to, and its foot made parallel to, the base of an automatic stand. The weight on the durometer and attack rate conform to ASTM D-2240.

The ratio of antioxidant to initiator is one factor to control the surface hardness of the cores.

In all preferred embodiments of invention, the hardness of the core at the surface is at most about the same as or different than the hardness of the core at the center as defined herein. Furthermore, the center hardness of the core may not be the hardest point in the core, but in all cases, it is preferred that it is at least equal to or harder than the surface. Additionally, the lowest hardness anywhere in the core does not have to occur at the surface. In some embodiments, the lowest hardness value occurs within about the outer 6 mm of the core surface. However, the lowest hardness value within the core can occur at any point from the surface, up to, but not including the center, as long as the surface hardness is still equal to, or less than the hardness of the center. It should be noted that in the present invention the formulation is the same throughout the core, or core layer, and no surface treatment is applied to the core to obtain the preferred surface hardness.

The casing layer may be made from a variety of materials. In one embodiment, the casing layer is formed from an ionomeric material including ionomeric polymers, preferably highly-neutralized ionomers (HNP). In another embodiment, the casing layer of the golf ball is formed from an HNP material or a blend of HNP materials. The acid moieties of the HNP's, typically ethylene-based ionomers, are preferably neutralized greater than about 70%, more preferably greater than about 90%, and most preferably at least about 100%. The HNP's can be also be blended with a second polymer component, which, if containing an acid group, may also be neutralized. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D, and a flexural modulus of between about 3,000 psi and about 200,000 psi.

Non-limiting examples of suitable ionomers include partially neutralized ionomers, blends of two or more partially neutralized ionomers, highly neutralized ionomers, blends of two or more highly neutralized ionomers, and blends of one or more partially neutralized ionomers with one or more highly neutralized ionomers. Methods of preparing ionomers are well known, and are disclosed, for example, in U.S. Pat. No. 3,264,272, the entire disclosure of which is hereby incorporated herein by reference. The acid copolymer can be a direct copolymer wherein the polymer is polymerized by adding all monomers simultaneously, as disclosed, for example, in U.S. Pat. No. 4,351,931, the entire disclosure of which is hereby incorporated herein by reference. Alternatively, the acid copolymer can be a graft copolymer wherein a monomer is grafted onto an existing polymer, as disclosed, for example, in U.S. Patent Application Publication No. 2002/0013413, the entire disclosure of which is hereby incorporated herein by reference.

In one embodiment of the present invention the HNP's are ionomers and/or their acid precursors that are preferably neutralized, either fully or partially, with a suitable base. The acid copolymers are preferably $\alpha$-olefin, such as ethylene, $C_{3-8}$ $\alpha,\beta$-ethylenically unsaturated carboxylic acid, such as acrylic and methacrylic acid, copolymers. They may optionally contain a softening monomer, such as alkyl acrylate and alkyl methacrylate, wherein the alkyl groups have from 1 to 8 carbon atoms.

The acid copolymers can be described as E/X/Y copolymers where E is ethylene, X is an $\alpha,\beta$-ethylenically unsaturated carboxylic acid, and Y is a softening comonomer. In a preferred embodiment, X is acrylic or methacrylic acid and Y is a $C_{1-8}$ alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

Specific acid-containing ethylene copolymers include, but are not limited to, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include, ethylene/methacrylic acid/n-butyl acrylate, ethylene/acrylic acid/n-butyl acrylate, ethylene/methacrylic acid/methyl acrylate, ethylene/acrylic acid/ethyl acrylate, ethylene/methacrylic acid/ethyl acrylate, and ethylene/acrylic acid/methyl acrylate copolymers. The most preferred acid-containing ethylene copolymers are, ethylene/(meth)acrylic acid/n-butyl, acrylate, ethylene/(meth) acrylic acid/ethyl acrylate, and ethylene/(meth)acrylic acid/methyl acrylate copolymers.

The acid copolymer is at least partially neutralized with a cation source, optionally in the presence of a high molecular weight organic acid, such as those disclosed in U.S. Pat. No. 6,756,436, the entire disclosure of which is hereby incorporated herein by reference. Suitable cation sources include, but are not limited to, metal ions and compounds of alkali metals, alkaline earth metals, and transition metals; metal ions and compounds of rare earth elements; ammonium salts and monoamine salts; and combinations thereof. Preferred cation sources are metal ions and compounds of magnesium, sodium, potassium, cesium, calcium, barium, manganese, copper, zinc, tin, lithium, and rare earth metals.

The acid moieties may be neutralized greater than about 80%, preferably from 90-100%, most preferably 100% without losing processability. This accomplished by melt-blending an ethylene $\alpha,\beta$-ethylenically unsaturated carboxylic acid copolymer, for example, with an organic acid or a salt of organic acid, and adding a sufficient amount of a cation source to increase the level of neutralization of all the acid moieties (including those in the acid copolymer and in the organic acid) to greater than 90%, (preferably greater than 100%).

The organic acids of the present invention are aliphatic, mono- or multi-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

The ionomers in a golf ball of the invention may also be more conventional ionomers, i.e., partially-neutralized with metal cations. The acid moiety in the acid copolymer is neutralized about 1 to about 90%, preferably at least about 20 to about 75%, and more preferably at least about 40 to about 70%, to form an ionomer, by a cation such as lithium, sodium, potassium, magnesium, calcium, barium, lead, tin, zinc, aluminum, or a mixture thereof.

Ionomers may be salts of O/X- and O/X/Y-type acid copolymers, wherein O is an $\alpha$-olefin, X is a $C_3$-$C_8$ $\alpha,\beta$-ethylenically unsaturated carboxylic acid, and Y is a softening monomer. O is preferably selected from ethylene and propylene. X is preferably selected from methacrylic acid, acrylic acid, ethacrylic acid, maleic acid, crotonic acid, fumaric acid, and itaconic acid. Methacrylic acid and acrylic acid are particularly preferred. As used herein, "(meth)acrylic acid" means methacrylic acid and/or acrylic acid. Likewise, "(meth)acrylate" means methacrylate and/or acrylate. Y is preferably selected from (meth)acrylate and alkyl(meth)acrylates wherein the alkyl groups have from 1 to 8 carbon atoms, including, but not limited to, n-butyl(meth)acrylate, isobutyl (meth)acrylate, methyl(meth)acrylate, and ethyl(meth)acrylate. Particularly preferred O/X/Y-type copolymers are ethylene/(meth)acrylic acid/n-butyl acrylate, ethylene/(meth) acrylic acid/methyl acrylate, and ethylene/(meth)acrylic acid/ethyl acrylate. Particularly suitable commercially available examples of very low acid ethylene copolymers and terpolymers include, but are not limited to, Nucrel® AE very low acid ethylene terpolymer, Nucrel® 0411HS very low acid ethylene copolymer, Nucrel® 0407 very low acid ethylene copolymer, Nucrel® 0403 very low acid ethylene copolymer, Nucrel® 0609HS very low acid ethylene copolymer, commercially available from E. I. du Pont de Nemours and Company.

The acid is typically present in the acid copolymer in an amount of 10 wt % or less, or 11 wt % or less, or 15 wt % or greater, or 16 wt % or greater, or in an amount within a range having a lower limit of 1 or 4 or 6 or 8 or 10 or 11 or 12 or 15 wt % and an upper limit of 15 or 16 or 20 or 25 or 30 or 35 or 40 wt %, based on the total weight of the acid copolymer. The ionomer may comprise low acid ionomer(s)(less than 11 wt %), medium acid (11-16 wt %) ionomer(s), high acid (>16 wt %) ionomer(s), or combinations thereof.

The ionomer may be a blend of a high acid ionomer neutralized with sodium and a high acid ionomer neutralized with zinc. A high acid ionomer is selected from sodium ionomers, lithium ionomers, zinc ionomers, magnesium ionomers, and blends of two or more thereof. For example, a 25/25/50 or 37.5/37.5/25 blend, of Surlyn® 8150 or Surlyn®8140 high acid sodium ionomer, Surlyn® 9150 or Surlyn®9120 high acid zinc ionomer. In another embodiment, a very low acid ethylene copolymer or terpolymer is highly neutralized with a fatty acid salt. Particularly suitable commercially available examples of very low acid ethylene copolymers and terpolymers include, but are not limited to, Nucrel® AE very low acid ethylene terpolymer, Nucrel® 0411HS very low acid ethylene copolymer, Nucrel® 0407 very low acid ethylene copolymer, Nucrel® 0403 very low acid ethylene copolymer, Nucrel® 0609HS very low acid ethylene copolymer, commercially available from E. I. du Pont de Nemours and Company.

Examples of commercially available ionomers include, but are not limited to, Surlyn® ionomers and DuPont® HPF 1000 and HPF 2000 highly neutralized ionomers, commercially available from E. I. du Pont de Nemours and Company; Clarix® ionomers, commercially available from A. Schulman, Inc.; Iotek® ionomers, commercially available from ExxonMobil Chemical Company; Amplify® IO ionomers, commercially available from The Dow Chemical Company; and blends of two or more thereof.

Particularly suitable ionomers also include polypropylene ionomers, including grafted polypropylene ionomers. Examples of commercially available polypropylene ionomers include, but are not limited to, Clarix® 130640 and 230620 acrylic acid-grafted polypropylene ionomers, commercially available from A. Schulman Inc., and Priex® 40101, 42101, 45101, and 48101, maleic anhydride-grafted polypropylene ionomers, commercially available from Solvay Engineered Polymers, Inc.

Particularly suitable ionomers also include polyester ionomers, including, but not limited to, those disclosed, for example, in U.S. Pat. Nos. 6,476,157 and 7,074,465, the entire disclosures of which are hereby incorporated herein by reference.

Particularly suitable ionomers also include low molecular weight ionomers, such as AClyn® 201, 201A, 295, 295A, 246, 246A, 285, and 285A low molecular weight ionomers, commercially available from Honeywell International Inc.

Particularly suitable ionomers also include ionomer compositions comprising an ionomer and potassium ions, such as those disclosed, for example, in U.S. Pat. No. 7,825,191, the entire disclosure of which is hereby incorporated herein by reference.

Additional suitable ionomers are disclosed, for example, in U.S. Patent Application Publication Nos. 2005/0049367, 2005/0148725, 2005/0020741, 2004/0220343, and 2003/0130434, and U.S. Pat. Nos. 5,587,430, 5,691,418, 5,866,658, 6,100,321, 6,562,906, 6,653,382, 6,777,472, 6,762,246, 6,815,480, and 6,953,820, the entire disclosures of which are hereby incorporated herein by reference.

Any golf ball component, namely core, casing layer, cover, etc. may also be formed from or comprise or include or be blended or otherwise combined or mixed with any of the following compositions as known in the art. Additionally, such materials may also or alternatively be mixed, blended or otherwise combined with the inventive cover composition to achieve particular desired golf ball characteristics:

(1) Polyurethanes, such as those prepared from polyols and diisocyanates or polyisocyanates and/or their prepolymers, and those disclosed in U.S. Pat. Nos. 5,334,673 and 6,506,851;
(2) Polyureas, such as those disclosed in U.S. Pat. Nos. 5,484,870 and 6,835,794; and
(3) Polyurethane-urea hybrids, blends or copolymers comprising urethane or urea segments.

Suitable polyurethane compositions comprise a reaction product of at least one polyisocyanate and at least one curing agent. The curing agent can include, for example, one or more polyols. The polyisocyanate can be combined with one or more polyols to form a prepolymer, which is then combined with the at least one curing agent. Thus, the polyols described herein are suitable for use in one or both components of the polyurethane material, i.e., as part of a prepolymer and in the curing agent. Suitable polyurethanes are described in U.S. Pat. No. 7,331,878, which is incorporated herein in its entirety by reference.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material. Suitable polyester polyols include, but are not limited to, polyethylene adipate glycol; polybutylene adipate glycol; polyethylene propylene adipate glycol; o-phthalate-1,6-hexanediol; poly(hexamethylene adipate)glycol; and mixtures thereof. The hydrocarbon chain can have saturated or unsaturated bonds, or substituted or unsubstituted aromatic and cyclic groups. In another embodiment, polycaprolactone polyols are included in the materials of the invention. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, polycarbonate polyols are included in the polyurethane material of the invention. Suitable polycarbonates include, but are not limited to, polyphthalate carbonate and poly(hexamethylene carbonate)glycol. The hydrocarbon chain can have saturated or unsaturated bonds, or substituted or unsubstituted aromatic and cyclic groups. In one embodiment, the molecular weight of the polyol is from about 200 to about 4000. Polyamine curatives are also suitable for use in the polyurethane composition of the invention and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline; m-phenylenediamine; 4,4'-methylene-bis-(2-chloroaniline); 4,4'-methylene-bis-(2,6-diethylaniline); 4,4'-methylene-bis-(2,3-dichloroaniline); 4,4'-diamino-3,3'-diethyl-5,5'-dimethyl diphenylmethane; 2,2',3,3'-tetrachloro diamino diphenylmethane; trimethylene glycol di-p-aminobenzoate; and mixtures thereof. Preferably, the curing agent of the present invention includes 3,5-dimethylthio-2,4-toluenediamine and isomers thereof, such as ETHACURE® 300, commercially available from Albermarle Corporation of Baton Rouge, La. Suitable polyamine curatives, which include both primary and secondary amines, preferably have molecular weights ranging from about 64 to about 2000.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxyl)ethoxy]benzene; 1,3-bis-{2-[2-(2-hydroxyethoxyl)ethoxy]ethoxy}benzene; 1,4-butanediol; 1,5-pentanediol; 1,6-hexanediol; resorcinol-di-(β-hydroxyethyl)ether; hydroquinone-di-(β-hydroxyethyl)ether; and mixtures thereof. Preferred hydroxy-terminated curatives include 1,3-bis(2-hydroxyethoxy)benzene; 1,3-bis-[2-(2-hydroxyethoxyl)ethoxy]benzene; 1,3-bis-{2-[2-(2-hydroxyethoxyl)ethoxy]ethoxy}benzene; 1,4-butanediol, and mixtures thereof. Preferably, the hydroxy-terminated curatives have molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane-urea composition may be formed with a single curing agent.

In a preferred embodiment of the present invention, saturated polyurethanes are used to form one or more of the cover layers, preferably the outer cover layer, and may be selected from among both castable thermoset and thermoplastic polyurethanes.

In this embodiment, the saturated polyurethanes of the present invention are substantially free of aromatic groups or moieties. Saturated polyurethanes suitable for use in the invention are a product of a reaction between at least one polyurethane prepolymer and at least one saturated curing agent. The polyurethane prepolymer is a product formed by a reaction between at least one saturated polyol and at least one saturated diisocyanate. As is well known in the art, that a catalyst may be employed to promote the reaction between the curing agent and the isocyanate and polyol, or the curing agent and the prepolymer.

Saturated diisocyanates which can be used include, without limitation, ethylene diisocyanate; propylene-1,2-diisocyanate; tetramethylene-1,4-diisocyanate; 1,6-hexamethylene-diisocyanate (HDI); 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; isophorone diisocyanate; methyl cyclohexylene diisocyanate; triisocyanate of HDI; triisocyanate of 2,2,4-trimethyl-1,6-hexane diisocyanate.

Saturated polyols which are appropriate for use in this invention include without limitation polyether polyols such as polytetramethylene ether glycol and poly(oxypropylene) glycol. Suitable saturated polyester polyols include polyethylene adipate glycol, polyethylene propylene adipate glycol, polybutylene adipate glycol, polycarbonate polyol and ethylene oxide-capped polyoxypropylene diols. Saturated polycaprolactone polyols which are useful in the invention include diethylene glycol-initiated polycaprolactone, 1,4-butanediol-initiated polycaprolactone, 1,6-hexanediol-initiated polycaprolactone; trimethylol propane-initiated polycaprolactone, neopentyl glycol initiated polycaprolactone, and polytetramethylene ether glycol-initiated polycaprolactone. The most preferred saturated polyols are polytetramethylene ether glycol and PTMEG-initiated polycaprolactone.

Suitable saturated curatives include 1,4-butanediol, ethylene glycol, diethylene glycol, polytetramethylene ether glycol, propylene glycol; trimethanolpropane; tetra-(2-hydroxypropyl)-ethylenediamine; isomers and mixtures of isomers of cyclohexyldimethylol, isomers and mixtures of isomers of cyclohexane bis(methylamine); triisopropanolamine; ethylene diamine; diethylene triamine; triethylene tetramine; tetraethylene pentamine; 4,4'-dicyclohexylmethane diamine; 2,2,4-trimethyl-1,6-hexanediamine; 2,4,4-trimethyl-1,6-hexanediamine; diethyleneglycol di-(aminopropyl)ether; 4,4'-bis-(sec-butylamino)-dicyclohexylmethane; 1,2-bis-(sec-butylamino)cyclohexane; 1,4-bis-(sec-butylamino)cyclohexane; isophorone diamine; hexamethylene diamine; propylene diamine; 1-methyl-2,4-cyclohexyl diamine; 1-methyl-2,6-cyclohexyl diamine; 1,3-diaminopropane; dimethylamino propylamine; diethylamino propylamine; imido-bis-propylamine; isomers and mixtures of isomers of diaminocyclohexane; monoethanolamine; diethanolamine; triethanolamine; monoisopropanolamine; and diisopropanolamine. The most preferred saturated curatives are 1,4-butanediol, 1,4-cyclohexyldimethylol and 4,4'-bis-(sec-butylamino)-dicyclohexylmethane.

Alternatively, other suitable polymers include partially or fully neutralized ionomer, metallocene, or other single-site catalyzed polymer, polyester, polyamide, non-ionomeric thermoplastic elastomer, copolyether-esters, copolyether-amides, polycarbonate, polybutadiene, polyisoprene, polystryrene block copolymers (such as styrene-butadiene-styrene), styrene-ethylene-propylene-styrene, styrene-ethylene-butylene-styrene, and the like, and blends thereof. Thermosetting polyurethanes or polyureas are suitable for the outer cover layers of the golf balls of the present invention.

Additionally, the polyurethane can be replaced with or blended with a polyurea material. Polyureas are distinctly different from polyurethane compositions, but also result in desirable aerodynamic and aesthetic characteristics when used in golf ball components. The polyurea-based compositions are preferably saturated in nature.

Without being bound to any particular theory, it is now believed that substitution of the long chain polyol segment in the polyurethane prepolymer with a long chain polyamine oligomer soft segment to form a polyurea prepolymer, improves shear, cut, and resiliency, as well as adhesion to other components. Thus, the polyurea compositions of this invention may be formed from the reaction product of an isocyanate and polyamine prepolymer crosslinked with a curing agent. For example, polyurea-based compositions of the invention may be prepared from at least one isocyanate, at least one polyether amine.

Any polyamine available to one of ordinary skill in the art is suitable for use in the polyurea prepolymer. Polyether amines are particularly suitable for use in the prepolymer. As used herein, "polyether amines" refer to at least polyoxyalkyleneamines containing primary amino groups attached to the terminus of a polyether backbone. Due to the rapid reaction of isocyanate and amine, and the insolubility of many urea products, however, the selection of diamines and polyether amines is limited to those allowing the successful formation of the polyurea prepolymers. In one embodiment, the polyether backbone is based on tetramethylene, propylene, ethylene, trimethylolpropane, glycerin, and mixtures thereof.

Suitable polyether amines include, but are not limited to, methyldiethanolamine; polyoxyalkylenediamines such as, polytetramethylene ether diamines, polyoxypropylenetriamine, and polyoxypropylene diamines; poly(ethylene oxide capped oxypropylene)ether diamines; propylene oxide-based triamines; triethyleneglycoldiamines; trimethylolpropane-based triamines; glycerin-based triamines; and mixtures thereof. In one embodiment, the polyether amine used to form the prepolymer is JEFFAMINE® D2000 (manufactured by Huntsman Chemical Co. of Austin, Tex.).

The molecular weight of the polyether amine for use in the polyurea prepolymer may range from about 100 to about 5000. In one embodiment, the polyether amine molecular weight is about 200 or greater, preferably about 230 or greater. In another embodiment, the molecular weight of the polyether amine is about 4000 or less. In yet another embodiment, the molecular weight of the polyether amine is about 600 or greater. In still another embodiment, the molecular weight of the polyether amine is about 3000 or less. In yet another embodiment, the molecular weight of the polyether amine is between about 1000 and about 3000, and more preferably is between about 1500 to about 2500. Because lower molecular weight polyether amines may be prone to forming solid polyureas, a higher molecular weight oligomer, such as JEFFAMINE® D2000, is preferred.

As briefly discussed above, some amines may be unsuitable for reaction with the isocyanate because of the rapid reaction between the two components. In particular, shorter chain amines are fast reacting. In one embodiment, however, a hindered secondary diamine may be suitable for use in the prepolymer. Without being bound to any particular theory, it is believed that an amine with a high level of stearic hindrance, e.g., a tertiary butyl group on the nitrogen atom, has a slower reaction rate than an amine with no hindrance or a low level of hindrance. For example, 4,4'-bis-(sec-butylamino)-dicyclohexylmethane (CLEARLINK® 1000) may be suitable for use in combination with an isocyanate to form the polyurea prepolymer.

The number of unreacted NCO groups in the polyurea prepolymer may be varied to control such factors as the speed of the reaction, the resultant hardness of the composition, and the like. For instance, the number of unreacted NCO groups in the polyurea prepolymer and polyether amine may be less than about 14 percent. In one embodiment, the polyurea prepolymer has from about 5 percent to about 11 percent unreacted NCO groups, and even more preferably has from about 6 to about 9.5 percent unreacted NCO groups. In one embodiment, the percentage of unreacted NCO groups is about 3 percent to about 9 percent. Alternatively, the percentage of unreacted NCO groups in the polyurea prepolymer may be about 7.5 percent or less, and more preferably, about 7 percent or less. In another embodiment, the unreacted NCO content is from about 2.5 percent to about 7.5 percent, and more preferably from about 4 percent to about 6.5 percent.

When formed, polyurea prepolymers may contain about 10 percent to about 20 percent by weight of the prepolymer of free isocyanate monomer. Thus, in one embodiment, the polyurea prepolymer may be stripped of the free isocyanate monomer. For example, after stripping, the prepolymer may contain about 1 percent or less free isocyanate monomer. In another embodiment, the prepolymer contains about 0.5 percent by weight or less of free isocyanate monomer.

The polyether amine may be blended with additional polyols to formulate copolymers that are reacted with excess isocyanate to form the polyurethane/polyurea hybrid. In one embodiment, less than about 30 percent polyol by weight of the copolymer is blended with the saturated polyether amine. In another embodiment, less than about 20 percent polyol by weight of the copolymer, preferably less than about 15 percent by weight of the copolymer, is blended with the polyether amine. The polyols listed above with respect to the polyurethane prepolymer, e.g., polyether polyols, polycaprolactone polyols, polyester polyols, polycarbonate polyols, hydrocarbon polyols, other polyols, and mixtures thereof, are also suitable for blending with the polyether amine. The molecular weight of these polymers may be from about 200 to about 4000, but also may be from about 1000 to about 3000, and more preferably are from about 1500 to about 2500.

The polyurea composition can be formed by crosslinking the polyurea prepolymer with a single curing agent or a blend of curing agents. The curing agent of the invention is preferably an amine-terminated curing agent, more preferably a secondary diamine curing agent so that the composition contains only urea linkages. In one embodiment, the amine-terminated curing agent may have a molecular weight of about 64 or greater. In another embodiment, the molecular weight of the amine-curing agent is about 2000 or less. As discussed above, certain amine-terminated curing agents may be modified with a compatible amine-terminated freezing point depressing agent or mixture of compatible freezing point depressing agents.

Suitable amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol di-(aminopropyl)ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; dipropylene triamine; imido-bis-propylamine; monoethanolamine, diethanolamine; triethanolamine; monoisopropanolamine, diisopropanolamine; isophoronediamine; 4,4'-methylenebis-(2-chloroaniline); 3,5; dimethylthio-2,4-toluenediamine; 3,5-dimethylthio-2,6-toluenediamine; 3,5-diethylthio-2,4-toluenediamine; 3,5; diethylthio-2,6-toluenediamine; 4,4'-bis-(sec-butylamino)-diphenylmethane and derivatives thereof; 1,4-bis-(sec-butylamino)-benzene; 1,2-bis-(sec-butylamino)-benzene; N,N'-dialkylamino-diphenylmethane; N,N,N',N'-tetrakis(2-hydroxypropyl)ethylene diamine; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; and mixtures thereof. In one embodiment, the amine-terminated curing agent is 4,4'-bis-(sec-butylamino)-dicyclohexylmethane.

Suitable saturated amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 4,4'-methylenebis-(2,6-diethylaminocyclohexane); 1,4-cyclohexane-bis-(methylamine); 1,3-cyclohexane-bis-(methylamine); diethylene glycol di-(aminopropyl)ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imido-bis-propylamine; monoethanolamine, diethanolamine; triethanolamine; monoisopropanolamine, diisopropanolamine; isophoronediamine; triisopropanolamine; and mixtures thereof. In addition, any of the polyether amines listed above may be used as curing agents to react with the polyurea prepolymers.

In a golf ball of the invention, the cover preferably comprises an opaque or translucent thermoset or thermoplastic aliphatic isocyanate-based material.

The flexural modulus of the cover material of a golf ball of the invention may be evaluated according to ASTM D-790.

Compression values are dependent on the diameter of the component being measured. In the present invention, a solid 1.55' sphere of inventive material may have a DCM compression anywhere from −75 to about 200, depending on the desired properties of the resulting golf ball, although numerous preferred ranges are as disclosed and coordinated herein. The Dynamic Compression Machine ("DCM") is an apparatus that applies a load to a core or ball and measures the number of inches the core or ball is deflected at measured loads. A crude load/deflection curve is generated that is fit to the Atti compression scale that results in a number being generated representing an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test. DCM is often used to capture compressions that fall outside the Atti compression scale range of −75 to 200, since the DCM scale compression range is −246 to 200

COR, as used herein, is determined by firing a golf ball or golf ball subassembly (e.g., a golf ball core) from an air cannon at two given velocities and calculating the COR at a velocity of 125 ft/s. Ball velocity is calculated as a ball approaches ballistic light screens which are located between the air cannon and a steel plate at a fixed distance. As the ball travels toward the steel plate, each light screen is activated, and the time at each light screen is measured. This provides an incoming transit time period inversely proportional to the ball's incoming velocity. The ball impacts the steel plate and rebounds though the light screens, which again measure the time period required to transit between the light screens. This provides an outgoing transit time period inversely proportional to the ball's outgoing velocity. COR is then calculated as the ratio of the outgoing transit time period to the incoming transit time period, $COR=V_{out}/V_{in}=T_{in}/T_{out}$. The COR value can be targeted by varying the peroxide and antioxidant types and amounts as well as the cure temperature and duration. The COR value can be targeted by varying the peroxide and antioxidant types and amounts as well as the cure temperature and duration.

The cover of the golf ball of the present invention may comprise any known color and optionally comprise surface off-sets, or depressions or projections, on its surface. Surface off-sets include dimples and marking other than dimples. For instance, the surface of the translucent cover may comprise depressed logos, text, lines, arcs, circles or polygons. The surface may also comprise raised projections in the form of logos, text, lines, arcs, circles or polygons. The inclusion of such surface off-sets on the translucent cover creates a unique visual effect, as the juxtaposition of thick and thin portions of the translucent cover material creates a "shadow" effect on the opaque surface below the translucent cover.

While any of the embodiments herein may have any known dimple number and pattern, a preferred number of dimples is 252 to 456, and more preferably is 330 to 392. The dimples may comprise any width, depth, and edge angle disclosed in the prior art and the patterns may comprises multitudes of dimples having different widths, depths and edge angles. The parting line configuration of said pattern may be either a straight line or a staggered wave parting line (SWPL). Most preferably the dimple number is 330, 332, or 392 and comprises 5 to 7 dimples sizes and the parting line is a SWPL.

In any of these embodiments the single-layer core may be replaced with a 2 or more layer core wherein at least one core layer has a hardness gradient.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

While it is apparent that the illustrative embodiments of the invention disclosed herein fulfill the objective stated above, it is appreciated that numerous modifications and other embodiments may be devised by those skilled in the art. Therefore, it will be understood that the appended claims are intended to cover all such modifications and embodiments, which would come within the spirit and scope of the present invention.

What is claimed is:

1. A golf ball comprising core, a casing layer surrounding the core, a cover layer disposed about the casing layer, and at least three coating layers $CL_1$, $CL_2$, and $CL_3$ disposed about the cover layer;
   wherein the core is formed from a substantially homogenous formulation and comprises a geometric center and an outer surface, the outer surface having a hardness of from about 50 Shore C to about 90 Shore C, the geometric center having a hardness of from about 50 Shore C to about 90 Shore C, and the hardness of the outer surface being different than the hardness of the geometric center by up to about 7 Shore C;
   the casing layer having an inner surface adjacent the outer surface and a casing layer outer surface $CL_{OS}$ surrounding the inner surface, $CL_{OS}$ having a hardness of from about 45 Shore D to about 80 Shore D;
   wherein the casing layer comprises a non-fluorescent colorant composition $C_{CL}$ comprising $TiO_2$ and a blue colorant composition and having a chroma value $C^*_{CL}$ as measured in the CIELAB color space of not greater than 10;
   the cover having a cover inner surface adjacent the casing outer surface and a cover outer surface $C_{OS}$ surrounding the cover inner surface, $C_{OS}$ having a hardness of from about 65 Shore C to about 90 Shore C;
   wherein the cover is formed from a thermoset polyurethane composition that is produced by a reaction of: (i) an aliphatic isocyanate composition; (ii) a polyether polyol-containing component; (iii) at least one chain-extender selected from the group consisting of amine-terminated chain-extenders, hydroxyl-terminated chain-extenders, and mixtures thereof; and (iv) a colorant composition $C_{CV}$ comprising $TiO_2$, a fluorescent colorant composition having a yellow hue as defined in the CIELAB color space, and at least one benzotriazole-based color stabilizer;
   wherein: (i) $CL_1$, $CL_2$, and $CL_3$ are different; (ii) $CL_1$ comprises an aliphatic isocyanate-based coating composition that is clear and has a color difference $\Delta E_{CMC}$ as measured in the CIELAB color space that differs from a cover color difference $\Delta E_{CMC}$ by less than 1 unit; and (iii) at least one of coating layers $CL_2$, and $CL_3$ comprise a coating composition comprising an interference and/or effects colorant composition in an amount of from 3 wt % to 30 wt % of total resin solids;
   wherein each of the cover layer, $CL_1$, $CL_2$, and $CL_3$ have a b* value as measured in the CIELAB color space such that b* of the cover layer >b* of $CL_1$>b* of $CL_2$>b* of $CL_3$,
   wherein: the casing layer has a white opaque color appearance $CL_{CA}$ as defined in the CIELAB color space that contributes to an overall finished golf ball color appearance $CA_{OA}$; the cover has a yellow color appearance $CV_{CA}$ as defined in the CIELAB color space that contributes to $CA_{OA}$; $CL_1$ has a clear color appearance $CL_{1CA}$ as defined in the CIELAB color space; $CL_2$ has a yellow pearlescent color appearance $CL_{2CA}$ as defined in the CIELAB color space that contributes to $CA_{OA}$; and CL₃ has an optical brightener color appearance $CL_{3CA}$ as defined in the CIELAB color space that contributes to $CA_{OA}$;

such that: (i) $CA_{OA}$ has a color difference $\Delta E_{cmc}$ as measured in the CIELAB color space that is less than a casing layer $\Delta E_{cmc}$ by greater than 30 units;

(ii) $CA_{OA}$ has a b* value as measured in the CIELAB color space ($b^*_{OA}$) that is less than b* of the cover layer by at least 10 units;

(iii) $CA_{OA}$ has an a* value as measured in the CIELAB color space ($a_{OA}$) such that $-50 \leq a^*_{OA} \leq -30$;

(iv) $90 \leq b^*_{OA} \leq 105$;

(v) $CA_{OA}$ has a lightness value L* as measured in the CIELAB color space ($L^*_{OA}$) that is greater than a lightness value of the casing layer ($L^*_{CL}$) by at least 5 units;

(vi) $CA_{OA}$ has a chroma value C* as measured in the CIELAB color space ($C^*_{OA}$) such that $C^*_{OA} > 95$; and wherein $CA_{OA}$ has a color stability difference $\Delta E_{cmc}$ as measured in the CIELAB color space in a QUV after 24 hrs. of less than 1.5 units.

2. The golf ball of claim 1, wherein at least one of CL2 and CL3 comprises TiO2 coated flakes, metal oxide coated flakes, or a combination thereof, having a particle size of from 6 μm to 48 μm.

3. The golf ball of claim 1, wherein CL2 comprises at least one of flakes, particulates, glitter specs, whiskers, fibers, filaments and lettering.

4. The golf ball of claim 1, wherein the aliphatic isocyanate composition comprises a blend of at least one aliphatic isocyanate and at least one cycloaliphatic isocyanate.

5. The golf ball of claim 4, wherein the aliphatic isocyanate comprises a hexamethylene diisocyanate-based polyisocyanate and the cycloaliphatic isocyanate comprises dicyclohexylmethane diisocyanate.

6. The golf ball of claim 1, wherein the polyether polyol-containing component comprises polytetramethylene ether glycol.

7. The golf ball of claim 1, wherein the core is formed from a polybutadiene composition.

8. The golf ball of claim 1, wherein the core has a diameter of from about 1.47 inches to about 1.55 inches.

9. The golf ball of claim 1, wherein the casing layer has a thickness of from about 0.025 inches to about 0.057 inches.

10. The golf ball of claim 1, wherein the core and casing layer, combined, have a diameter of from about 1.57 inches to about 1.65 inches.

11. The golf ball of claim 1, wherein the cover has a thickness of from about 0.020 inches to about 0.055 inches.

12. The golf ball of claim 1, wherein $CL_1$, $CL_2$, and $CL_3$, combined, have a thickness of from about 0.1 μm to about 100 μm.

13. The golf ball of claim 1, wherein $CL_1$, $CL_2$, and $CL_3$ each have a thickness of from about 0.1 μm to about 25 μm.

14. The golf ball of claim 1, wherein the core outer surface has a hardness of from about 68 Shore C to about 74 Shore C.

15. The golf ball of claim 1, wherein the casing layer has a surface hardness of from about 85 Shore C to about 97 Shore C.

16. The golf ball of claim 1, wherein the casing layer has a surface hardness of from about 65 Shore D to about 75 Shore D.

17. The golf ball of claim 1, wherein the cover has an on the ball hardness of from about 80 Shore C to about 90 Shore C.

18. The golf ball of claim 1, wherein the cover has an on the ball hardness of from about 55 Shore D to about 65 Shore D.

19. The golf ball of claim 1, wherein the chain extender is an aromatic amine-terminated chain extender.

20. The golf ball of claim 1, wherein indicia is formed onto $CL_2$.

21. The golf ball of claim 1, wherein $CA_{OA}$ has a color stability difference $\Delta E_{cmc}$ as measured in the CIELAB color space in a QUV after 24 hrs. of less than 1.2 units.

22. The golf ball of claim 1, wherein the casing layer comprises an ionomer resin.

23. A method of making a golf ball comprising:
providing a core;
  wherein the core is formed from a substantially homogenous formulation and comprises a geometric center and an outer surface, the outer surface having a hardness of from about 50 Shore C to about 90 Shore C, the geometric center having a hardness of from about 50 Shore C to about 90 Shore C, and the hardness of the outer surface being different than the hardness of the geometric center by up to about 7 Shore C;
forming a casing layer about the core;
  the casing layer having an inner surface adjacent the outer surface and a casing layer outer surface $CL_{OS}$ surrounding the inner surface, $CL_{OS}$ having a hardness of from about 45 Shore D to about 80 Shore D;
  the casing layer comprising a non-fluorescent colorant composition $C_{CL}$ comprising TiO₂ and a blue colorant composition and having a chroma value $C^*_{CL}$ as measured in the CIELAB color space of not greater than 10;
forming a cover layer about the casing layer;
  the cover having a cover inner surface adjacent the casing outer surface and a cover outer surface $C_{OS}$ surrounding the cover inner surface, $C_{OS}$ having a hardness of from about 65 Shore C to about 90 Shore C;
  the cover being formed from a thermoset polyurethane composition that is produced by a reaction of: (i) an aliphatic isocyanate composition; (ii) a polyether polyol-containing component; (iii) at least one chain-extender selected from the group consisting of amine-terminated chain-extenders, hydroxyl-terminated chain-extenders, and mixtures thereof; and (iv) a colorant composition $C_{CV}$ comprising TiO₂, a fluorescent colorant composition having a yellow hue as defined in the CIELAB color space, and at least one benzotriazole-based color stabilizer; and
forming at least three coating layers $CL_1$, $CL_2$, and $CL_3$ about the cover layer;
  wherein: (i) $CL_1$, $CL_2$, and $CL_3$ are different; (ii) $CL_1$ comprises an aliphatic isocyanate-based coating composition that is clear and has a color difference $\Delta E_{CMC}$ as measured in the CIELAB color space that differs from a cover color difference $\Delta E_{CMC}$ by less than 1 unit; and (iii) at least one of coating layers $CL_2$, and $CL_3$ comprise a coating composition comprising an interference and/or effects colorant composition in an amount of from 3 wt % to 30 wt % of total resin solids;
wherein each of the cover layer, $CL_1$, $CL_2$, and $CL_3$ have a b* value as measured in the CIELAB color space such that b* of the cover layer >b* of $CL_1$>b* of $CL_2$>b* of $CL_3$; and
wherein: (a) the casing layer has a white opaque color appearance $CL_{CA}$ as defined in the CIELAB color space that contributes to an overall finished golf ball color appearance $CA_{OA}$;

(b) the cover has a yellow color appearance $CV_{CA}$ as defined in the CIELAB color space that contributes to $CA_{O4}$;
(c) $CL_1$ has a clear color appearance $CL_{1CA}$ as defined in the CIELAB color space, $CL_2$ has a yellow pearlescent color appearance $CL_{2CA}$ as defined in the CIELAB color space that contributes to $CA_{O4}$; and
(d) $CL_3$ has an optical brightener color appearance $CL_{3CA}$ as defined in the CIELAB color space that contributes to $CA_{O4}$;

such that: (i) $CA_{O4}$ has a color difference $\Delta E_{cmc}$ as measured in the CIELAB color space that is less than a casing layer $\Delta E_{cmc}$ by greater than 30 units;
(ii) $CA_{O4}$ has a b* value as measured in the CIELAB color space ($b^*_{O4}$) that is less than b* of the cover layer by at least 10 units;
(iii) $CA_{O4}$ has an a* value as measured in the CIELAB color space ($a^*_{O4}$) such that $-50 \leq a^*_{O4} \leq -30$;
(iv) $90 \leq b^*_{O4} \leq 105$;
(v) $CA_{O4}$ has a lightness value L* as measured in the CIELAB color space ($L^*_{O4}$) that is greater than a lightness value of the casing layer ($L^*_{CL}$) by at least 5 units;
(vi) $CA_{O4}$ has a chroma value C* as measured in the CIELAB color space ($C^*_{O4}$) such that $C^*_{O4} > 95$; and wherein $CA_{O4}$ has a color difference stability $\Delta E_{cmc}$ as measured in the CIELAB color space in a QUV after 24 hrs. of less than 1.5 units.

24. The method of making a golf ball of claim 23, wherein the color difference stability $\Delta E_{cmc}$ as measured in the CIELAB color space in a QUV after 24 hrs. of less than 1.2 units.

* * * * *